United States Patent
Khatami et al.

(10) Patent No.: US 11,500,856 B2
(45) Date of Patent: Nov. 15, 2022

(54) RDMA-ENABLED KEY-VALUE STORE

(71) Applicant: Oracle International Corporation, Redwood Shores, CA (US)

(72) Inventors: Zahra Khatami, Redwood Shores, CA (US); Avneesh Pant, Redwood Shores, CA (US); Namrata Jampani, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 16/571,423

(22) Filed: Sep. 16, 2019

(65) Prior Publication Data

US 2021/0081401 A1 Mar. 18, 2021

(51) Int. Cl.
*G06F 16/22* (2019.01)
*G06F 16/23* (2019.01)
*G06F 15/173* (2006.01)

(52) U.S. Cl.
CPC .... *G06F 16/2379* (2019.01); *G06F 15/17331* (2013.01); *G06F 16/2255* (2019.01)

(58) Field of Classification Search
CPC .................. G06F 16/2379; G06F 16/2255
See application file for complete search history.

(56) References Cited

U.S. PATENT DOCUMENTS

| | | | |
|---|---|---|---|
| 9,164,702 B1 | 10/2015 | Nesbit | |
| 9,292,564 B2 | 3/2016 | Kamp et al. | |
| 9,448,901 B1 | 9/2016 | Aslam | |
| 9,977,760 B1 * | 5/2018 | Diehl | G06F 15/17331 |
| 10,956,335 B2 * | 3/2021 | Tao | G06F 16/24552 |
| 2004/0225719 A1 | 11/2004 | Kisley et al. | |

(Continued)

FOREIGN PATENT DOCUMENTS

| | | |
|---|---|---|
| WO | WO2007/045839 A2 | 4/2007 |
| WO | WO 2017/087267 A1 | 5/2017 |

OTHER PUBLICATIONS

Wang et al., "C-Hint: An Effective and Reliable Cache Management for RDMA-Accelerated Key-Value Stores", dated 2014, 2 pages.
Tyler Szepesi, et al. "Nessie: A Decoupled, Client-Driven, Key-Value Store using RDMA", Copyright 2015 the authors CS-2015-09, 13 pages.

(Continued)

*Primary Examiner* — Eliyah S. Harper
(74) *Attorney, Agent, or Firm* — Hickman Becker Bingham Ledesma LLP

(57) ABSTRACT

According to one or more embodiments, lookup, insertion, and deletion operations are allowed to continue during actions required for collision remediation. When relocation operations are used to resolve a collision, information encoded in header portions of the hash table entries that store the key-value pairs indicates when the associated key-value pairs are undergoing relocation. This information facilitates continued access to the RKVS during the relocation process by allowing other processes that access the RKVS to handle relocations without failure. Furthermore, when hash table expansion is needed in order to resolve a collision, a second, larger, hash table is allocated, and lookup operations continue on both the old hash table and the new hash table. One or more embodiments further prevent insertion, lookup, and deletion failures in the RKVS using flags, encoded in header information in hash table entries, that reflect the state of the respective key-value pairs in the store.

22 Claims, 11 Drawing Sheets

(56) References Cited

U.S. PATENT DOCUMENTS

| | | |
|---|---|---|
| 2006/0136570 A1 | 6/2006 | Pandya |
| 2007/0239790 A1 | 10/2007 | Cattell |
| 2007/0239797 A1 | 10/2007 | Cattell |
| 2011/0137861 A1 | 6/2011 | Burnett |
| 2012/0331243 A1 | 12/2012 | Aho |
| 2013/0031331 A1* | 1/2013 | Cheriton .............. G06F 12/10 711/206 |
| 2013/0262613 A1 | 10/2013 | Hefty |
| 2014/0189032 A1 | 7/2014 | Sugimoto |
| 2014/0304353 A1 | 10/2014 | Evans |
| 2015/0067088 A1 | 3/2015 | Guerin |
| 2016/0026605 A1 | 1/2016 | Pandit |
| 2016/0028819 A1 | 1/2016 | Schultz |
| 2016/0188527 A1 | 6/2016 | Cherian |
| 2017/0034270 A1 | 2/2017 | Nagasubramaniam |
| 2017/0075856 A1 | 3/2017 | Suzue |
| 2017/0091246 A1 | 3/2017 | Risvik |
| 2017/0103039 A1* | 4/2017 | Shamis .............. H04L 67/1097 |
| 2017/0109317 A1 | 4/2017 | Hack et al. |
| 2017/0124021 A1 | 5/2017 | Brown |
| 2017/0147507 A1 | 5/2017 | Horii |
| 2017/0149890 A1 | 5/2017 | Shamis |
| 2017/0149924 A1* | 5/2017 | Peterson .............. H04L 67/5682 |
| 2017/0277655 A1 | 9/2017 | Das |
| 2017/0357611 A1 | 12/2017 | Cherian |
| 2018/0048732 A1* | 2/2018 | Zhu .................... H04L 67/1097 |
| 2018/0096049 A1 | 4/2018 | Kondiles |
| 2018/0316760 A1 | 11/2018 | Chernin |
| 2018/0341653 A1 | 11/2018 | Teotia |
| 2019/0187916 A1 | 6/2019 | Romem |
| 2020/0183842 A1* | 6/2020 | Kahle .................... G06F 9/466 |

OTHER PUBLICATIONS

Szepesi, Tyler, et al. "Designing a low-latency cuckoo hash table for write-intensive workloads using RDMA." First International Workshop on Rack-scale Computing. 2014, 6 pages.

Mitchell et al., "Using One-Sides RDMA Reads to Build a Fast, CPU-Efficient Key-Value Store", 12 pages.

Kalia et al., "Using RDMA Efficiently for Key-Value Services", SIGCOMM'14, Aug. 17-22, 2014, Chicago, IL, USA, 15 pages.

Kalia et al., "Using RDMA Efficiently for Key-Value Services", ACM SIGVOMM, https://www.researchgate.net/publication/266659972_Using_RDMA_Eff, 5 pages, Aug. 2014.

Fan et al., "MemC3: Compact and Concurrent MemCache With Dumber Caching and Smarter Hashing", NSDI'13, dated Apr. 2013, 14 pages.

Dragojević, et al., "FaRM: Fast Remote Memory", https://www.usenix.org/conference/nsdi14/technical-sessions/dragojević, dated Apr. 2014, 15 pages.

Teotia, U.S. Appl. No. 15/606,322, filed May 26, 2017, Office Action, dated Oct. 21, 2019.

Teotia, U.S. Appl. No. 15/606,322, filed May 26, 2017, Office Action, dated Mar. 22, 2019.

Wei, Xingda, et al., "Fast in-Memory Transaction Processing Using RDMA and HTM", Operating Sys. Principles, ACM pp. 87-104, XP058074463, DOI: 10.1145/2815400.2815419, Oct. 4, 2015, 18pgs.

Behringer, et al., "Memory Management for Concurrent RDMA: A Design for a Key-Value Store", https://os.itec.kit.edu/downloads/da_2014_behringer-benjamin_key-value-store.pdf, Jun. 1, 2014, 83pgs.

Teotia, U.S. Appl. No. 15/606,322, filed May 26, 2017, Notice of Allowance, dated Mar. 4, 2020.

* cited by examiner

| | SNAPSHOT 430 | SNAPSHOT 432 | SNAPSHOT 434 | SNAPSHOT 436 | SNAPSHOT 438 |
|---|---|---|---|---|---|
| 402 | 1000 $K_X$ $V_X$ | 1000 $K_X$ $V_X$ | 1000 $K_X$ $V_X$ | 1000 $K_X$ $V_X$ | 1000 $K_X$ $V_X$ |
| 404 | 0000 00 00 | 0000 00 00 | 0000 00 00 | 0000 00 00 | 0000 00 00 |
| 406 | 0000 00 00 | 1100 $K_Z$ 00 | 1100 $K_Z$ $V_Z$ | 1000 $K_Z$ $V_Z$ | 0000 00 00 |
| 408 | 1000 $K_Y$ $V_Y$ | 1000 $K_Y$ $V_Y$ | 1000 $K_Y$ $V_Y$ | 1000 $K_Y$ $V_Y$ | 1000 $K_Y$ $V_Y$ |
| 410 | 0000 00 00 | 1100 $K_Z$ 00 | 1100 $K_Z$ 00 | 0000 00 00 | 0000 00 00 |

FIG. 4

RDMA-ENABLED KEY-VALUE STORE

FIELD OF THE INVENTION

The present invention relates to management of a key-value store and, more specifically, to improving availability of a Remote Direct Memory Access (RDMA)-enabled key-value store during collision remediation and reducing failure of operations being performed concurrently by multiple processes within the store.

BACKGROUND

Key-value storage is essential in many applications, such as in designing scalable industry data managements. The performance of a key-value store plays an important role in achieving high-speed data processing. Countless techniques have been developed to improve the efficiency of delivering, to a client application, the data that the client application requests from a key-value store. Such techniques typically involve executing, on the server device, a database server instance that receives the requests, gathers the requested data from the key-value store, and provides the data to the database application. Frequently, numerous client applications will send requests to the same database server instance. The greater the workload in the database server instance, the less likely the database server instance will be able to respond to all requests efficiently.

Unfortunately, if the database server instance that is executing on a server device fails, the data in the volatile memory of the server device typically becomes unavailable to client applications. Under these circumstances, the client applications wait for the database server instance to be recovered or, when possible, obtain the data they require from other sources (e.g. by sending a request to another database server instance that has access to another copy of the desired data).

Alternatively, a client application may retrieve data that is managed by a database server instance from the volatile memory of a server machine that is executing the database server instance using a Remote Direct Memory Access (RDMA) request. This technique allows the client to retrieve the data from the volatile memory of the host server machine without involving the database server instance in the retrieval operation.

The RDMA requests issued by the client machine or client are unilateral operations and do not require CPU interruption or OS kernel involvement on the host server machine (RDBMS server). That is, the RDMA reads and writes are performed without any involvement of the remote database server instance. For example, InfiniBand is a switched fabric network that is widely used in high-performance computing systems. RDMA over Converged Ethernet (RoCE) is a network protocol that allows direct memory accesses over Ethernet. InfiniBand and RoCE network interface card are aimed to achieve a low latency by providing RDMA and kernel-bypass in addition to implementing several layers of the network stack in hardware.

RDMA enables zero-copy transfers and reduces latency and CPU overhead significantly. It allows one process to directly access the memory of the remote device without involving any processes running on the device. Thus, because the data retrieval does not involve the database server instance, the retrieval may succeed even when the database server instance (or the host server machine itself) has stalled or has become unresponsive.

Compared to the traditional message passing methods, RDMA achieves the lowest round-trip latency, highest throughput and zero CPU overhead. Research has been done to explore the implementation of RDMA to improve performance of in-memory datastores. For this purpose, various methods have been proposed for maintaining a key-value store that leverages RDMA to achieve high throughput with low CPU overhead. However, most designs do not support multiple processes performing RDMA read and write operations in parallel on key-value store. Generally, such systems use one-sided RDMA reads to access data and leave write operations to the server instance managing the data, which prevents proper scale up when increasing numbers of processes access the data.

FaRM is a general-purpose distributed computing platform that exposes memory of a cluster of machines as a shared address space. FaRM uses a variant of Hopscotch hashing to create a locality-aware hash table for its key-value store design. For GET operations, clients read several consecutive Hopscotch entries, one of which contains the desired key with high probability. For PUT operations, clients write their request to a circular buffer in volatile memory accessible by a server instance. The server instance polls this buffer to detect new write requests. As a result, the PUT operation design of FaRM prevents having multiple processes perform RDMA write operations directly in the key-value store.

Pilaf is another key-value store design that aims for high performance and low CPU use. For GET operations, clients access a cuckoo-based hash table, stored in memory accessible by the server instance, using RDMA read operations. However, for PUT operations, clients send their write requests to the server instance using a SEND message. As with FaRM, Pilaf provides multiple PUT operations by sending the write requests to the server instance. Pilaf does not support multiple processes performing RDMA write operations directly in the key-value store.

HERD is a key-value system designed to optimize use of an RDMA network. It takes a hybrid approach, using both RDMA requests and messaging. In HERD, clients send their requests to the server instance using RDMA write requests over an Unreliable Connection (UC). These write operations place the PUT and/or GET requests into a per-client memory region accessible by the server instance. The server instance polls these memory regions for new requests. Upon detecting a new request, the server instance executes the request in conventional fashion using its local data structures. The server instance then sends a reply to the client using a SEND message over an Unreliable Datagram. As with FaRM and Pilaf, HERD also provides multiple PUT operations via processes sending requests to the server instance. However, HERD does not support multiple processes performing write operations directly into the key-value store.

Nessie is a key-value system that includes a hash table design that supports multiple processes performing RDMA read and write operations directly in the key-value store. In the Nessie system, an index hash table maps each key to one or more locations in a secondary data table in which the corresponding key-value pair is stored. The keys map to entries in the index hash table based on one or more hash functions. The entries of the data table further include a valid flag, which indicates whether the corresponding entries belong to an in-progress PUT operation.

Each client is given ownership over a set of data items in the data table, and a client may only update data items that are owned by the client. The high-level structure of every operation on the data table consists of: reading the primary and secondary indices in the index table for the specified key to identify locations of the key-value pair in the data table; performing the operation on the appropriate items at the identified locations in the data table; checking that the locations listed for the key-value pair have not been modified by another client, i.e., via modification of entries of the index table; and setting the valid bits on any new data items in the data table. However, Nessie's design has several weaknesses, including the potential for insertion failure issues, brownout issues during collision resolution, and lookup failure issues.

The Nessie system has the potential for brownout failures during collision resolution. Specifically, if a write operation of a key-value pair, ($Key_x$, $VAL_x$), fails because both the primary and secondary entries in the index hash table are filled with location data for different key-value pairs, then a relocation operation is performed to empty an entry in the index hash table to allow completion of the write operation. The first key-value pair that is a candidate for relocation is the data in the primary entry for $Key_x$. If the relocation operation fails because the alternative entry for the relocation candidate is filled, a second relocation operation attempt is made to relocate the data item in the secondary entry. A failure to empty the secondary entry results in a message being sent to the server instance, which then revokes access to its local memory and performs a chain of migrations or a table resize before allowing clients to proceed. In this design, the server instance prevents clients from performing any read or write operations in the key-value store before the collision resolution is complete, which can result in an unwanted brownout during which the key-value store is not available to clients.

The Nessie system also has the potential for insertion failures. For example, in the Nessie system, for a client to write a value to the key-value store, the client first writes the data to a free entry, in the secondary data table, that the client owns. This data entry includes a flag that marks the data as invalid. Once the location of the entry in the secondary data table is recorded in the index table, the write operation is complete and the flag for the inserted key-value pair is updated to indicate that the data is now valid. However, insertion in the Nessie system can potentially fail, such as when two processes A and B attempt to insert the same key-value pair, ($Key_x$, $VAL_x$), into the key-value store at the same time, and a third process C attempts to delete ($Key_x$, $VAL_x$) after it is inserted. Only one of processes A and B should succeed in inserting the key-value pair, and then the inserted key-value pair should be deleted by process C, resulting in removal of ($Key_x$,$VAL_x$) from the key-value store. However, an insertion failure may occur based on undesirable delay of one of the processes to insert the key-value pair until after process C has deleted it from the store, which would result in ($Key_x$,$VAL_x$) remaining in the key-value store after the data should have been deleted by process C.

The Nessie system also has the potential for lookup failures. In this design, to perform a read operation for a particular key, a client first reads the location data stored at the key's primary entry in the index hash table. Because cuckoo hashing uses multiple potential indices per key, it is possible that the location data at an entry that maps to a requested key is for a different key than the one requested. Thus, when reading an entry in the index hash table, the client verifies that the key stored associated with the location data matches the requested key. If the keys match, the corresponding value is returned to the client from the indicated location in the data table. Otherwise, the secondary entry in the index hash table is checked. Also, if the primary entry is empty, the secondary entry for the key is checked. If the secondary entry is not empty and is associated with the requested key, the client proceeds to read the value stored at the specified location in the secondary data table.

Lookup in this design potentially fails because delay between reading location information in the index hash table and reading data at the location within the data table is not considered. Specifically, there might be delay between a client reading the location of a given entry and reading data stored at that the indicated location. During this delay, the data stored at the indicated location within the secondary data table might be modified or moved to another location in the secondary data table by another process. In this case, the client may return a value that is not associated with the requested key.

Thus, it would be beneficial to support multiple processes performing RDMA read and write operations directly in a key-value store without the potential for lookup failures, brownout failures, and/or insertion failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 4-7 depict respective time-series of snapshots of a hash table implementing a key-value store.

DETAILED DESCRIPTION

Figure 1:
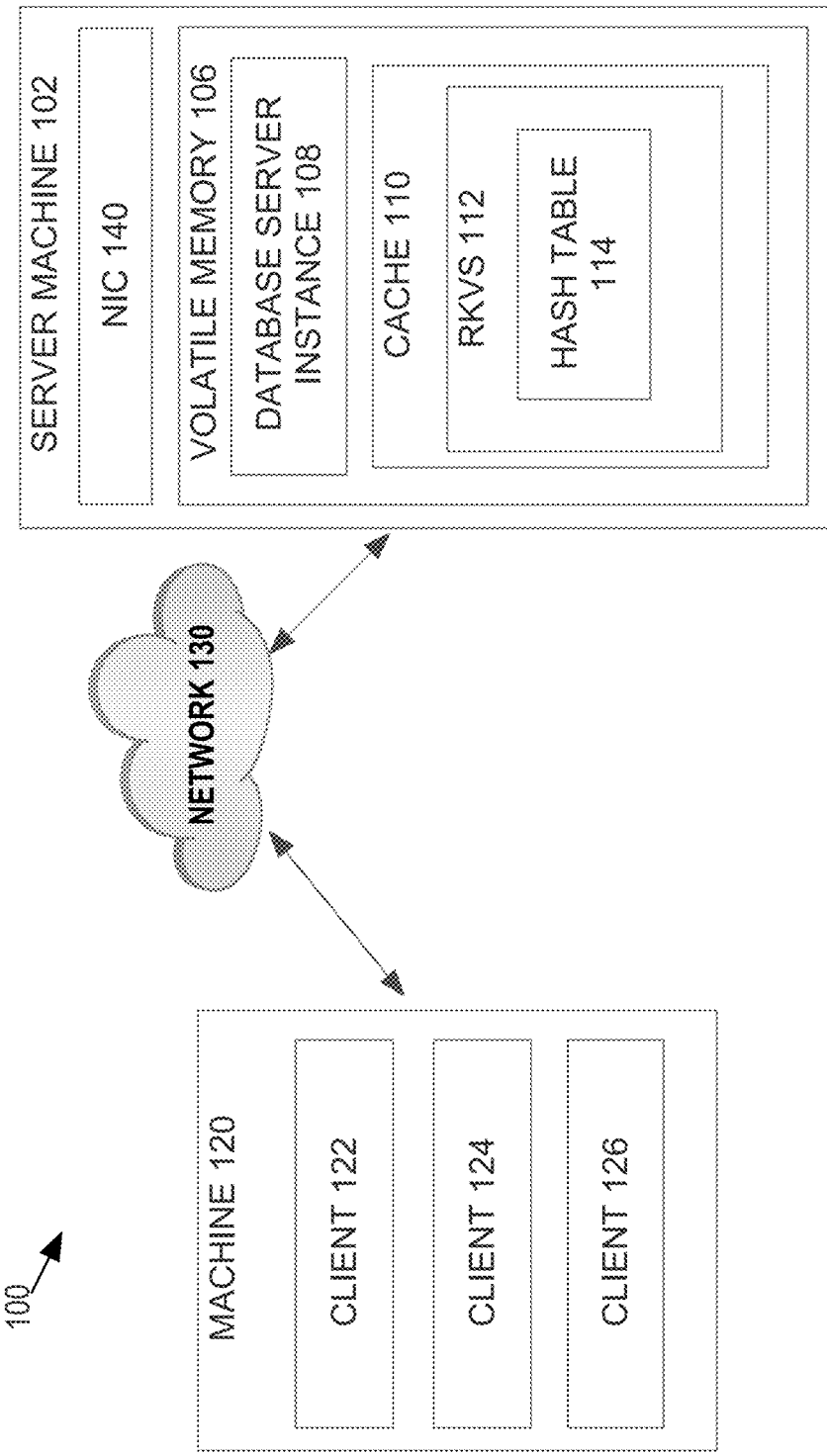
FIG. 1 is a block diagram of a system that is configured to enable one or more clients to remotely access a key-value store that is managed by a database server instance within the volatile memory of a server machine that executes the database server instance.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one or more embodiments, Remote Direct Memory Access (RDMA) requests and local requests, potentially from multiple processes, are able to be used on an RDMA-enabled key-value store (RKVS). Thus, the RKVS provides lock-free multi-process operations for local and remote read and write operations without requiring clients to involve the managing process of the RKVS. As such, embodiments allow for fully parallel hash table insertion, lookup and deletion operations.

Embodiments eliminate the need to limit access to the RKVS during collision resolution. Specifically, according to one or more embodiments, lookup, insertion, and deletion operations are allowed to continue during actions required for collision remediation. Collision remediation actions include relocating key-value pairs to make room for an insertion and/or expanding the size of the hash table that stores the RKVS. The increased availability of the RKVS during collision remediation allows databases that require high availability and performance to continue functioning without brownout conditions that negatively impact the performance of a key-value store.

When relocation operations are used to resolve a collision, information encoded in header portions of the hash table entries that store the key-value pairs indicates when the associated key-value pairs are undergoing relocation. This information facilitates continued access to the RKVS during the relocation process by allowing other processes that access the RKVS to handle relocations without failure. Furthermore, when hash table expansion is needed in order to resolve a collision, a second, larger, hash table is allocated, and lookup operations continue on both the old hash table and the new hash table. As key-value pairs are migrated from the old hash table to the new hash table, relocation operations between the two tables are handled using the header information, as described above. Any insertion operations in the RKVS are performed on the new hash table, and deletion operations are performed on both the old hash table and new hash table, as needed. Once data migration is complete, the old hash table is deallocated, and operations continue as before with the new hash table.

One or more embodiments further prevent insertion and lookup failures in the RKVS using flags, encoded in the header information in the hash table entries, that reflect the state of the respective key-value pairs in the store. Specifically, the header information in a given hash table entry comprises one or more of four single-bit flags. Such flags provide information regarding one or more of: (a) whether the associated entry is populated with key-value data, which allows a process to determine whether the entry is occupied without requiring accessing any separate data structure other than the RKVS hash table; (b) whether data in the associated entry is in the process of being written to the particular entry, which aids in determining whether to delay an operation over the particular entry until the data has been written—such information allows processes to avoid failures caused by moving ahead with an operation while another process writes to one of the entries involved in the operation; (c) whether the data in the associated entry is in the process of being relocated, which allows for continued operation of the RKVS during collision remediation; and/or (d) whether another process has priority to write a particular key-value pair that matches the key information stored in the associated entry, which helps to prevent double-insertion of key-value pairs.

According to embodiments, each operation over the RKVS is a multi-part process that includes a sub-operation that reads header information from a target entry in the RKVS. A process that initiates such an operation may utilize the retrieved header information to abort additional portions of the sub-operations of the operation, thereby avoiding a potential failure situation. According to one or more embodiments described below, the process follows the aborted operation with one or more further operations in a manner that is based, at least in part, on the retrieved header information.

System and RDMA Overview

FIG. 1 is a block diagram of a system 100 that is configured to enable one or more clients to remotely access a key-value store that is managed by a database server instance within the volatile memory of a server machine that executes the database server instance. In FIG. 1, a machine 120 is configured with a plurality of clients 122-126, which may be implemented variously as database application(s), database server instance(s), or any other kind of process that is configured to send RDMA requests. Further, a server machine 102 is configured with volatile memory 106 in which a database server instance 108 runs. A cache 110 of volatile memory 106 includes an RDMA-enabled key-value store (RKVS) 112 that is managed by database server instance 108.

Database applications, other database server instances, and other kinds of processes conventionally retrieve and/or write key-value data to a remote key-value store, such as RKVS 112, by sending database commands to database server instance 108. However, using the techniques described herein, some or all of the key-value operations required by clients 122-126 are performed through RDMA-based access to volatile memory 106 of server machine 102. As shown in FIG. 1, RKVS 112 is implemented by at least a hash table 114. As illustrated in FIG. 1, key-value pairs may be written to or read from RKVS 112 by any of clients 122-126 via an RDMA request to read from or write to hash table 114. Any such RDMA request may be received in parallel with other RDMA requests from other clients.

Server machine 102 and machine 120 are communicatively coupled to a network 130. Network 130 may be implemented using any network protocol or fabric that facilitates RDMA requests.

In addition to transferring the RDMA access information to one or more of clients 122-126, the preliminary steps for enabling RDMA access may also include database server instance 108 providing certain information to network interface circuitry (NIC) 140 through which server machine 102 is coupled to network 130. NIC 140 may be implemented as any kind of network interface circuitry, including as a chip on a server blade associated with server machine 102, as a network interface card of server machine 102, etc. Specifically, according to an embodiment, database server instance 108 registers with NIC 140 which regions of volatile memory 106 are amenable to RDMA access. According to one embodiment, in response to the RDMA registration, NIC 140 provides the one or more authentication keys to database server instance 108. According to an embodiment, these keys are eventually provided to a client so that the client can prove that it is authorized when making an RDMA access to volatile memory 106.

The RDMA techniques described herein assume an underlying network fabric to allow data transfers between one or more of clients 122-126 and server machine 102 whose volatile memory stores the cached data. Such an underlying network fabric may be, for example, an InfiniBand Interconnect. According to an embodiment, an RDMA request for RKVS 112 is serviced by NIC 140, through which server machine 102 is coupled to network 130, using a transport protocol implemented in NIC 140. According to another embodiment, an RDMA request for RKVS 112 is serviced by a management layer of network 130. However, the techniques described herein are not limited to any particular underlying network fabric.

Hash Table Collision Avoidance Scheme

According to an embodiment, hash table 114 employs open addressing, which does not incur in-operation memory allocation or pre-allocation at different addresses, as does chaining, which leads to more cache line sharing. According to an embodiment, hash table 114 further implements one or more schemes to avoid hash map collisions. Embodiments are described herein as implementing a cuckoo hash collision avoidance scheme in which multiple hash functions are utilized in sequence to identify entries in hash table 114 for a given key-value pair. For such a scheme, when two hash functions are used, there is an 80% load factor for the hash table, and when three hash functions are used, there is a 91% load factor for the hash table.

To illustrate a cuckoo hash scheme, client 122 of system 100 (FIG. 1) applies a first hash function, of a sequence of functions, to the key of a particular key-value pair. Application of the first hash function identifies a primary entry P in hash table 114 for the particular key-value pair. If entry P does not store the particular key-value pair (in the case of a read request) or is full with another key-value pair (in case of a write request), client 122 then applies a second hash function, of the sequence, to the key of the particular key-value pair, which identifies a secondary entry S in hash table 114 for the key-value pair. In this way, according to the cuckoo hash scheme, clients traverse the sequence of hash functions to identify multiple entries in the hash table for a single key-value pair.

Nevertheless, given that different collision avoidance schemes fit better with different applications for which RKVS 112 may be used, embodiments are not limited to a cuckoo hash collision avoidance scheme. Specifically, according to one or more embodiments, any of multiple hash table collision avoidance schemes, which are multi-thread safe, may be applied to hash table 114, including cuckoo hash, hopscotch, red-black tree, split-ordered list, etc. Thus, embodiments provide multiple options for hash table collision management.

Header Flag Bits

Figure 2:
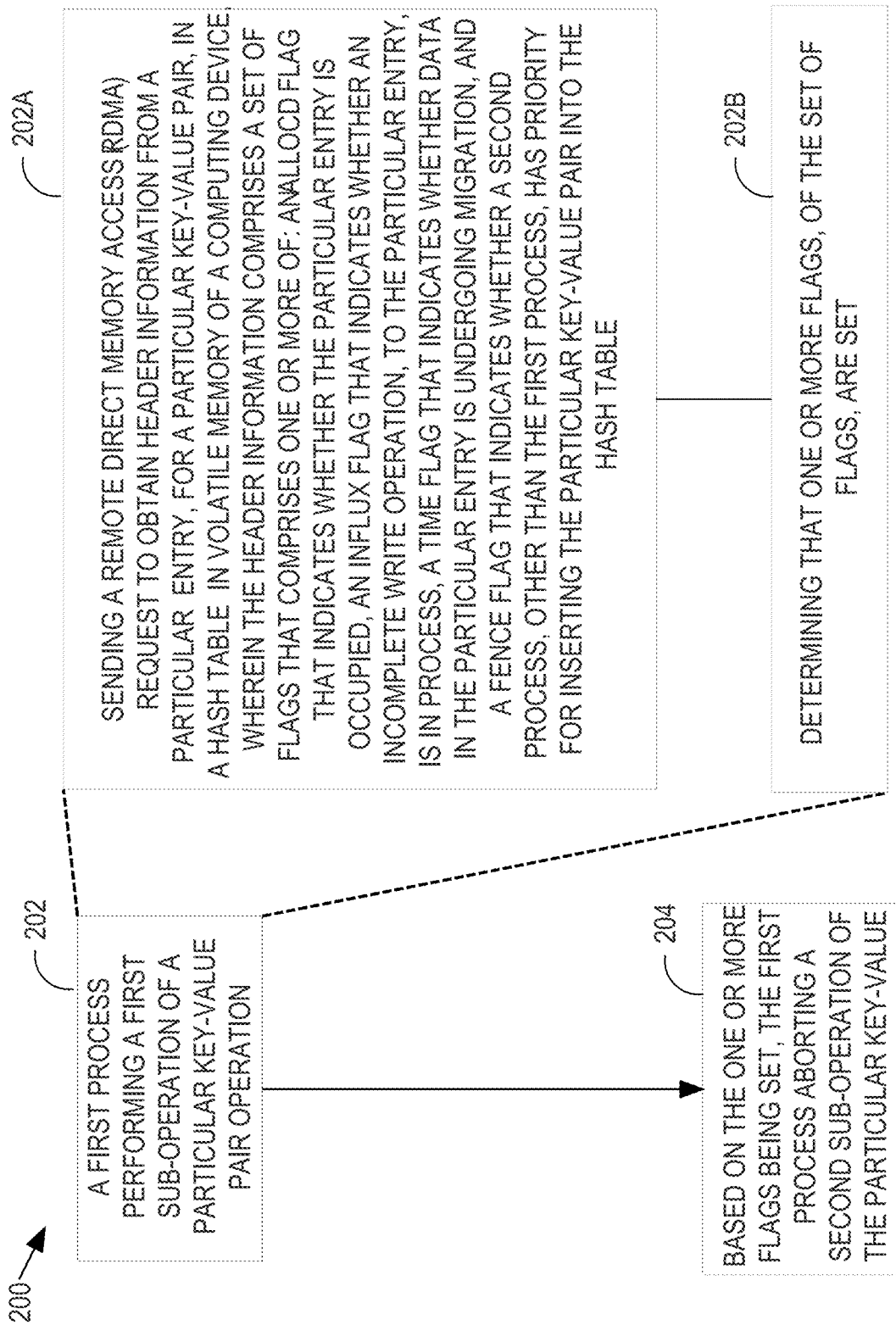
FIG. 2 depicts a flowchart for retrieving header information from a hash table entry during a first sub-operation of a key-value pair operation and aborting a second sub-operation of the key-value pair operation based on one or more set flags in the header information.

According to one or more embodiments, the entries of hash table 114 include one or more header bits that serve as flags for processes, such as clients 122-126, that request information from the hash table. FIG. 2 depicts a flowchart 200 for retrieving header information from a hash table entry during a first sub-operation of a key-value pair operation and aborting a second sub-operation of the key-value pair operation based on one or more flags in the header information being set. Specifically, at step 202 of flowchart 200, a first process performs a first sub-operation of a particular key-value pair operation by performing steps 202A and 202B of flowchart 200. At step 202A, a remote direct memory access (RDMA) request is sent to obtain header information from a particular entry, for a particular key-value pair, in a hash table in volatile memory of a computing device, wherein the header information comprises a set of flags that comprises one or more of: an Allocd flag that indicates whether the particular entry is occupied, an Influx flag that indicates whether an incomplete write operation, to the particular entry, is in process, a Time flag that indicates whether data in the particular entry is undergoing migration, and a Fence flag that indicates whether a second process, other than the first process, has priority for inserting the particular key-value pair into the hash table.

For example, client 122 sends an RDMA request to NIC 140, via network 130, to retrieve information for a key-value pair ($K_x$, $V_x$) in hash table 114. Client 122 identifies a hash table entry for the key-value pair by applying a hash function to $K_x$, which returns in an identifier of an entry that is mapped to ($K_x$, $V_x$). According to the example embodiment in which hash table 114 is managed according to a cuckoo collision avoidance scheme that uses the sequence hash functions H1, H2, and H3, client 122 runs H1 over $K_x$ to identify a first candidate entry for the particular key-value pair in hash table 114.

Figure 3:
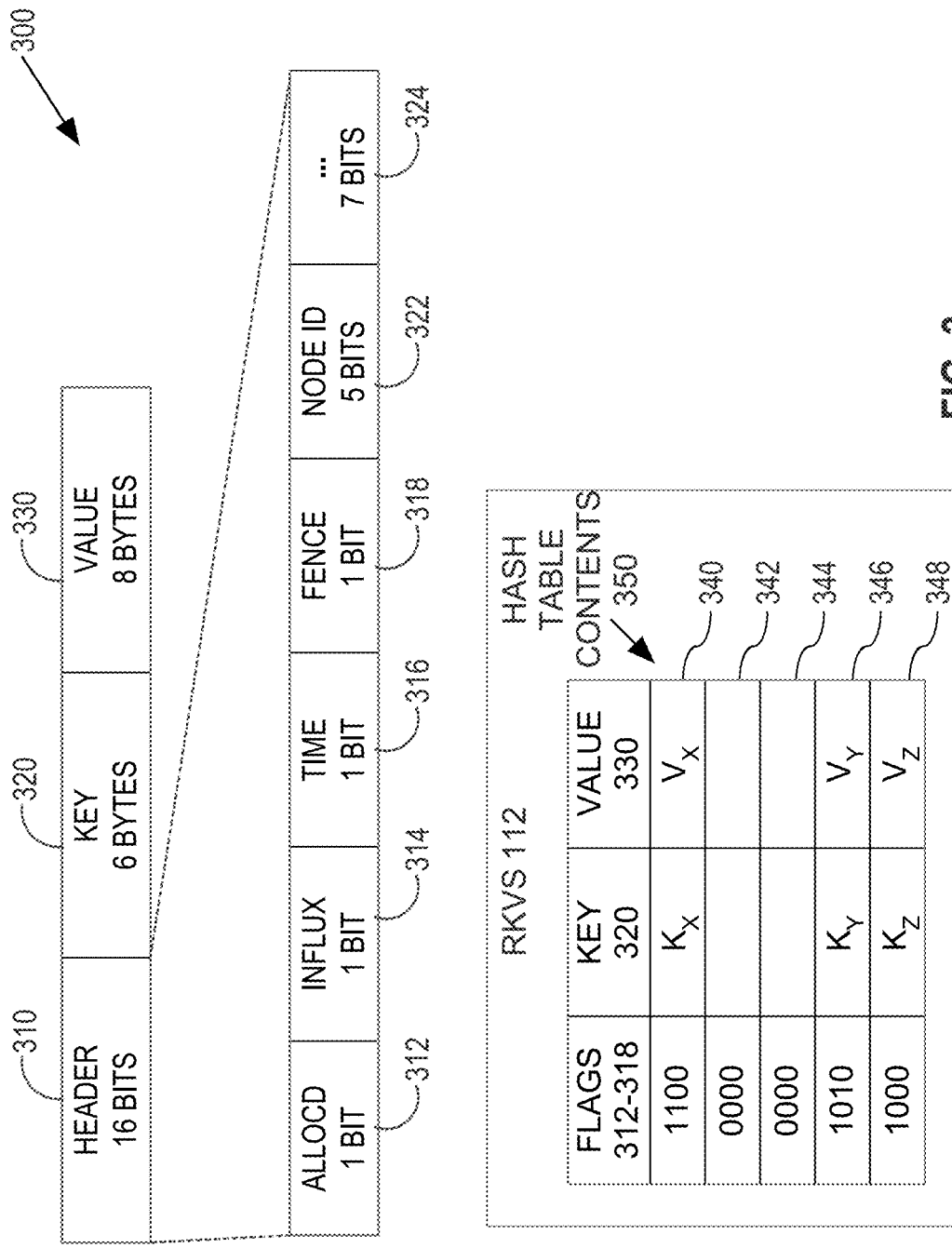
FIG. 3 depicts an example hash table entry configuration and also example hash table contents.

FIG. 3 depicts an example hash table entry configuration 300 with 16 bytes of data that includes 6 bytes of key 320 information that represents a key of a key-value pair, and 8 bytes of value 330 information that represents a value of the key-value pair. Entry configuration 300 further includes 16 bits of header 310 information that, in the embodiment depicted in FIG. 3, includes four 1-bit flags, five bits of node identifier 322 information, and seven bits of reserved header space 324.

The four 1-bit flags include an Allocd flag 312, an Influx flag 314, a Time flag 316, and a Fence flag 318. The following summarizes the utilities of the various flags, according to one or more embodiments (with further details provided below):

Allocd flag 312 gets set when new data is going to be inserted in the associated hash table entry. Utility of this flag includes avoiding multiple processes attempting to insert data in the entry at the same time. While an entry is being used to store a key-value pair, the associated Allocd flag 312 remains set.

Influx flag 314 gets set when insertion of data in the associated hash table entry is in process and not yet completed. Utility of this flag includes stalling lookups at this entry until the data is inserted completely. After the data insertion is complete, Influx flag 314 is unset, i.e., by the process that inserted the data. Utilization of this flag facilitates avoidance of potential lookup failures.

Time flag 316 gets set at the beginning of moving data in the associated hash table entry to another location during collision remediation. Utility of this flag includes informing clients that request data at the entry whether the key-value pair is in the process of being relocated. After the relocation operation is complete, Time flag 316 is unset by the process that performed the relocation, such as database server instance 108. Utilization of this flag allows processes to continue operations in RKVS 112 during collision resolution.

Fence flag 318 gets set when a process that is inserting a particular key-value pair into another entry of hash table 114 determines that a different process is also inserting the same particular key-value pair into the associated hash table entry. Utility of this flag includes allowing one of multiple processes attempting to insert a particular key-value pair into RKVS 112 at the same time to take priority over the insertion operation by instructing the other processes to abort insertion of the key-value pair, thus avoiding double-insertion of the key-value pair into RKVS 112.

According to an embodiment, node identifier 322 in header 310 is used to identify a node on which hash table 114 is stored, i.e., machine 102. In this embodiment, node identifier 322 is used in connection with a distributed hash table that implements RKVS 112, i.e., to track the nodes of a multi-node system on which the different key-value pairs are stored.

FIG. 3 further depicts an example of the contents 350 of hash table 114 implementing RKVS 112. The example hash table contents 350 includes entries 340-348 and also column-type depictions to show an abbreviated listing of different kinds of data within each entry. Notwithstanding the depiction of columns, according to an embodiment, the entries of a hash table that implements RKVS 112 include strings of data, such as 1000 01110 0000000 6_BYTE_KEY 8_BYTE_VALUE, without separation of the data by columns.

Thus, each of entries 340-348 in example hash table contents 350 includes data for flags 312-318 (depicted in that order), key 320 information, and value 330 information. Herein, Allocd flag 312, Influx flag 314, Time flag 316, and Fence flag 318 are represented as an ordered series of four bits, such as 1000, in which each respective flag is represented by its place within the ordered series of bits in the order indicated by hash table entry configuration 300. Entries in hash table 114 may include other data, such as a node identifier 322, which is not included in example hash table contents 350. A node identifier 322, such as '01110' included in the example string of data above, identifies the node that is slated to store the key-value pair, such as machine 102 in the case of entries that belong in hash table 114.

According to one or more embodiments, any RDMA request that allows for retrieval of data from an entry of a hash table and evaluation of the retrieved data and/or writing to an entry of a hash table may be used to implement operations within RKVS 112, as described herein. According to an embodiment, compare-and-swap (CAS) requests are used to write to or identify the contents of header 310, key 320 and/or value 330 for an entry in hash table 114, as needed. A CAS request may be performed remotely using an RDMA-based CAS request, or may be performed locally, e.g., by database server instance 108 that maintains RKVS 112.

The following Pseudocode (1) describes an example implementation of a CAS operation:

Pseudocode (1): Example implementation of a CAS operation

```
<1>    bool compare and swap(int *accum, int *dest, int newval)
<2>    {
<3>        if (*accum == *dest) {
<4>            *dest = newval;
<5>            return true;
<6>        } else {
<7>            *accum = *dest;
<8>            return false;
<9>        }
<10>   }
```

This example CAS operation determines whether the value at an accum pointer is the same as the value at a dest pointer. If so, the operation returns true and swaps the information at the dest pointer with the newval argument. If not, the operation returns false and populates the location identified by the accum pointer with the value at the dest pointer for later review.

According to an embodiment, CAS operations operate over 8 bytes of data. Thus, a single CAS operation may (a) read and/or write both header 310 and key 320 information at a given entry of hash table 114, or (b) read and/or write value 330 at the entry. Accordingly, any operation being implemented, at least partially, by a CAS operation requires at least two sub-operations, over a target entry, which include at least a first sub-operation to read/write header 310 and key 320 and a second sub-operation to read/write to various portions of the target entry as needed.

A given sub-operation may require performance over multiple entries in one or more hash tables. For example, as described below, an insertion operation requires the client to attempt to reserve all entries that map to the key-value pair being inserted. According to an embodiment, the requests that are required to perform a given sub-operation are performed by the client in parallel. This embodiment is used for the descriptions of the example RKVS operations herein. However, according to another embodiment, the various requests required to perform a given sub-operation are performed serially by one or more clients that access RKVS 112.

Lookup Operation Design

Returning to the discussion of step 202A of flowchart 200, the key-value pair operation being performed by client 122 is a lookup operation to read, from RKVS 112, a value $V_x$ that is associated with a key $K_x$. Client 122 runs hash function H1 over $K_x$ to identify a first candidate entry for the key-value pair in hash table 114. For example, H1 maps $K_x$ to entry 340 of example hash table contents 350. Client 122 initiates a first sub-operation of the lookup operation by sending an RDMA CAS request to NIC 140, via network 130, where the CAS request reads the 8 bytes of the identified entry 340 that includes header 310 information and key 320 information. According to an embodiment, descriptions herein of sub-operations to evaluate or set the status of header 310 and key 320 information from a target entry involves such a CAS request (either RDMA or local).

CAS-type operations are useful for this purpose because the functioning of a CAS request inherently provides information about whether the state of the header and key information from a target entry match a desired state. Thus, in the case of a first sub-operation that is configured to explore the status of a target entry, the CAS request allows ready understanding of the state of the entry. Further, in the case of a sub-operation that is configured to set the header and/or key information of a target entry, the existing information is only over-written if the entry is in an expected state. This inherent check of the status of the entry by the CAS request prior to writing to the entry avoids accidental over-writing of changes made by other processes.

The CAS request compares the first 8 bytes of entry 340 to 8 bytes of data that would be present in entry 340 if it were populated with the particular key-value pair and ready to be read. Specifically, if an entry is ready to be read, the flags in the header 310 information for the entry will be 1000, i.e., a set Allocd flag that indicates that the entry is occupied, with the other flags being unset to indicate that there are no special circumstances that cause the entry to be in an intermediate state. Thus, in the example RDMA CAS operation from client 122, the accum pointer points at the value 1000 01110 0000000 $K_x$ where $K_x$ is the 6-byte key value for the particular key-value pair that client 122 is attempting to look up. This value for the accum pointer indicates that the request is for the particular key-value pair associated with a node identifier 322 of 01110 (e.g., the identifier of machine 102) in a state that is ready to read. As indicated in FIG. 3, entry 340, which is referred to by the nest pointer in the CAS operation, has the value 1100 01110 0000000 $K_x$, which indicates that the entry is associated with $K_x$, but the set Influx flag indicates that a write operation to the entry is in process and the entry is not ready to be read. Insertion operations utilizing the Influx flag are described in further detail below.

Finally, the newval argument of the CAS request is the same value that is located at the accum pointer because client 122 does not need to change the value of the retrieved 8 bytes from entry 340. According to an embodiment, client 122 causes multiple threads to perform, in parallel, the indicated CAS operation on each of the entries in hash table 114 that map to $K_x$ based on each of hash functions H1, H2, and H3.

Returning to the discussion of flowchart 200 of FIG. 2, at step 202B, it is determined that one or more flags, of the set of flags, are set. For example, the values stored at the accum and dest pointers in the example CAS request above are not the same, and the CAS operation returns a false, which indicates to client 122 that entry 340 is not ready to be read. Because of the failed comparison, the memory referenced by the accum pointer is populated with the value at the dest pointer, i.e., 1100 01110 0000000 K. Client 122 determines, based on this value referenced by the accum pointer, that the Influx flag 314 is set for entry 340, which indicates that insertion of data in entry 340 is in process and not yet completed.

At step 204 of flowchart 200, based on the one or more flags being set, the first process aborts a second sub-operation of the particular key-value pair operation. For example, client 122 determines, based on the Influx flag 314 being set for entry 340, that the lookup operation on the particular key-value pair should be aborted for entry 340. As such, client 122 aborts a second sub-operation of the lookup operation that would comprise an RDMA read request to read value 330 from entry 340.

As another example, a second hash function used for hash table 114, H2, maps $K_x$ to entry 346 of example hash table contents 350. As described above, client 122 determines that Time flag 316 is set for entry 346, which indicates that data in entry 346 is in process of being relocated to another entry, and the relocation operation is not yet completed. Accordingly, client 122 determines, based on the Time flag 316 being set for entry 346, that the lookup operation on the particular key-value pair should be aborted for entry 346. As such, client 122 aborts a second sub-operation of the lookup operation that would comprise an RDMA read request to read value 330 from entry 346.

Thus, instead of reading a value for $(K_x, V_x)$ from RKVS 112 while another process performs an insertion operation or a relocation operation for the key-value pair, which may result in a lookup failure, client 122 waits for a pre-determined amount of time that is sufficient for the other process to complete the current operation that affects the target entry and then tries the lookup operation again.

Lookup Operation Timeout

In some cases, there may be a delay between a client finding a desired key in a particular entry of hash table 114 and reading the associated value from the entry. During this delay, it is possible that the entry has been changed, which would cause a lookup failure when the client reads the changed value. As such, according to an embodiment, each client computes the amount of delay between the start of a first sub-operation of a given lookup operation to the start of the second sub-operation for the lookup operation. If this delay becomes greater than a pre-determined lookup time-out time period, the client restarts the lookup operation from the first sub-operation.

As described in further detail below, an operation that changes the value of a target entry requires three sub-operations: (1) a first sub-operation (e.g., CAS-type) to set appropriate flags in header 310 of the target entry and to set key 320 to the appropriate key, if needed; (2) a second sub-operation (e.g., write-type) to set value 330 of the target entry to be the value of the key-value pair being written; and (3) a third sub-operation (e.g., CAS-type) to unset appropriate flags in header 310 to indicate the completion of the write operation. As such, according to one or more embodiments, the pre-determined lookup time-out time period represents of an amount of time that is greater than the latency of one RDMA operation and less than the latency of two RDMA operations performed back-to-back.

To illustrate, a successful first sub-operation of the lookup operation ensures that a write operation has not yet been initiated on the target entry. Initiation of the second sub-operation of the lookup operation immediately after completion of the first sub-operation ensures that any write operation, initiated after the start of the first sub-operation of the lookup operation, cannot complete the two sub-operations that are required to change the value before the second sub-operation of the lookup operation retrieves the correct value from the entry. In other words, adherence to the pre-determined lookup time-out ensures that data in the target entry of a given lookup operation cannot be modified before the lookup operation is completed.

Illustration of Lookup Failure Avoidance

The following is an illustration of a potential lookup failure that may be caused by delay between sub-operations of a lookup operation in the Nessie system. In this example, there are two entries in the index table, P and S, available for $(K_x, V_x)$ according to the cuckoo scheme with two hash functions. The primary entry P of the index table stores location information for $(K_x, V_x)$, which identifies a first entry in the secondary data table as the location of the key-value pair. While entry P stores the location data for $(K_x, V_x)$, a process A reads the location of $(K_x, V_x)$ from entry P. After reading the location data from entry P, and before reading the key-value pair $(K_x, V_x)$ from the indicated location in the secondary data table, the data stored in the first entry of the secondary data table is changed to a different key-value pair. For example, a process B that controls the first entry in the data table moves $(K_x, V_x)$ to a second entry in the secondary data table and populates the first entry with a different key-value pair. After process B changes the data in the secondary data table, process B updates the location of $(K_x, V_x)$ in the index table, e.g., in slot P. However, process A has already read the previous (and now incorrect) location data for $(K_x, V_x)$ from the index table and attempts to read the key-value pair from the first entry in the secondary data table, which does not yield the expected key-value pair. Thus, the lookup operation by process A fails to retrieve $V_x$ from the key-value store.

Such a potential lookup failure is addressed by embodiments described above. Specifically, according to one or more embodiments, given the scenario posed above in which primary entry P for $(K_x, V_x)$ is empty and the key-value pair is stored in secondary entry S, client 122 initiates a lookup operation for the key-value pair in entry P of hash table 114. Client 122 determines that the Allocd flag of entry P is not set, indicating that entry P is empty. Client 122 also initiates a lookup operation for the key-value pair in the secondary entry for the pair, entry S.

After reading the header and key of entry S, and before reading its value, database server instance 108 initiates a relocation operation to move ($K_x$, $V_x$) from entry S to entry P in hash table 114, e.g., due to collision resolution. In connection with relocating ($K_x$, $V_x$) to entry P, database server instance 108 sets the Allocd flag and the Influx flag in header 310 of entry P and also sets key 320 of entry P to K. Database server instance 108 also sets the Time flag in header 310 of entry S, where the Allocd bit of entry S remains set. This information in headers 310 and keys 320 of entries P and S shows that ($K_x$, $V_x$) is in the process of being inserted to entry P and also is in the process of being relocated from entry S, and that these processes have not yet been completed.

If the pre-determined lookup time-out for the lookup operation performed by client 122 over entry S does not toll and the lookup operation completes, then client 122 is able to retrieve the correct value from entry S via an RDMA read request prior to database server instance 108 changing the value stored in entry S. However, if the second sub-operation of the lookup operation is not started before the pre-determined lookup time-out tolls, then it is not guaranteed that client 122 can retrieve $V_x$ before entry S is changed. Thus, if the time-out tolls for the lookup operation, then client 122 aborts the lookup operation. If client 122 then reads entries P and S prior to completion of the relocation operation, client 122 determines from headers 310 of the entries that they are not ready to be read. Thus, client 122 waits an amount of time that is configured to allow a write operation to terminate before re-attempting the lookup operation. As such, client 122 is guaranteed to retrieve the correct value for the key-value pair.

INSERTION OPERATION DESIGN: INFLUX FLAG

According to one or more embodiments, utilization of the Influx flag 314 and Fence flag 318 allows processes to avoid insertion failures. Specifically, embodiments allow multiple processes to write to and delete from hash table 114 reliably such that double-insertion issues and deletion issues are avoided.

The following is an illustration of a potential insertion failure that may be caused by multiple processes inserting the same key-value pair into RKVS 112, as might be seen in a Nessie system. In this example, two processes A and B attempt to insert the same key-value pair, ($K_z$, $V_z$), into a key-value store in the same time frame. Further, a third process C attempts to delete ($K_z$, $V_z$) subsequent to its insertion. In this example, ($K_z$, $V_z$) maps to two entries in the index table, P and S. In connection with writing ($K_z$, $V_z$) to the key-value store, process A first books entries P and S in the index table by setting its flag to be invalid. After setting data of entry P with location data indicating a location of ($K_z$, $V_z$) in the secondary data table, and before process A sets the flag associated with ($K_z$, $V_z$) to be valid, a process B attempts to write the same ($K_z$, $V_z$) in entry P. It first checks whether the flag associated with ($K_z$, $V_z$) is valid or not. Since the flag has not yet been updated to indicate that the pair is valid, based on the proposed design, process B will repeat the insertion operation again after some delay. The amount of this delay has not been specified in the Nessie design. If this delay is longer than it takes for process A to complete insertion of ($K_z$, $V_z$) into entry P and for process C to complete the deletion operation from entry P, ($K_z$, $V_z$) will be inserted by process B after the data has been deleted by process C. This result is not desired because completion of the deletion operation by process C should have cleared ($K_z$, $V_z$) from the hash table after the pair was inserted by either process A or B.

Embodiments address potential insertion failures, such as the one explained above. Specifically, according to an embodiment, header 310 for each entry in hash table 114 includes an Influx flag and a Fence flag that are used to communicate the current status of an ongoing insertion operation to other processes. FIG. 4 depicts a series of snapshots 430-438 of hash table 114 (having entries 402-410) on a progressing timeline. Snapshots 430-438 depict how clients 122-126 interact in the above scenario, according to an embodiment. Specifically, in the example depicted in FIG. 4, ($K_z$, $V_z$) maps to both entries 406 and 410. In this example, the collision avoidance scheme for hash table 114 utilizes hash functions H1 and H2, in sequence, to map key-value pairs to entries in the hash table. The key-value pair ($K_z$, $V_z$) maps to entry 406 based on H1 and, as such, entry 406 takes precedence over entry 410, which is mapped to the key-value pair based on H2.

At snapshot 430, client 122 determines that both entries 406 and 410 are empty via a first sub-operation, of an insertion operation, that reads headers 310 of the entries. Client 122 books these entries by setting their Influx and Allocd flags and inserting $K_z$ into the key 320 information for the entries, as depicted in snapshot 432. Thus, embodiments prevent double-insertion of the key-value pair by reserving all entries in hash table 114 that are both available and map to the key-value pair.

Before the completion of the insertion operation by client 122, at snapshot 432, client 124 attempts to insert the same ($K_z$, $V_z$) into entries 406 and 410. Because the first sub-operation of such an insertion involves reading at least header 310 and key 320 from the entries to determine the current statuses of the entries, client 124 determines that both entries 406 and 410 are reserved by another process for the same key, $K_z$. Based on this determination, client 124 aborts a second sub-operation of the insertion operation and does not perform any further action to insert the key-value pair. If client 126 attempts, before the insertion operation is completed, to lookup ($K_z$, $V_z$) in entries 406 and 410 as a first sub-operation for a deletion operation, client 126 determines that the insertion operation for ($K_z$, $V_z$) is not yet completed based on the Influx bit of both entries being set, as shown in snapshot 432. Thus, client 126 delays a pre-determined amount of time, which is long enough for another process to complete an insertion operation, and then restarts the deletion operation from the first sub-operation, as described in further detail below.

As shown in snapshot 434, after completion of the first sub-operation of the insertion operation, client 122 performs a second sub-operation (e.g., using an RDMA write-type request) of the insertion operation to set value 330 in entry 406 to $V_z$. According to an embodiment, client 122 selects entry 406 as the entry in which to insert the key-value pair based on the sequence of hash functions on which the collision avoidance scheme for hash table 114 is based.

As shown in snapshot 436, after completion of the second sub-operation, client 122 performs a third sub-operation of the insertion operation to set the flags in header 310 of entry 406 to 1000, indicating that the information in entry 406 is finalized and ready to read. The third sub-operation also involves setting the flags in header 310 of entry 410 to 0000 (and, according to an embodiment, zeroing out key 320 information in the entry) to indicate that the entry is empty. Thus, hash table 114 includes only one copy of ($K_z$, $V_z$) notwithstanding the attempt to insert the key-value pair by multiple processes at once.

Also, the insertion failure described above is reliably avoided and ($K_z$, $V_z$) is able to be removed from entry 406 of hash table 114 successfully, e.g., by client 126, as shown in snapshot 438. For example, if client 126 attempts to delete ($K_z$, $V_z$) at any time before the insertion operation is completed, performance of a first sub-operation, of the deletion operation, to retrieve at least header 310 and key 320 information from entries 406 and 410 reveals that, for both entries 406 and 410, the Allocd and Influx flags are set and key 320 information shows $K_z$, as shown in snapshot 432. This configuration of header flags and key information indicates that entries 406 and 410 are currently booked for an insertion operation to insert ($K_z$, $V_z$). This information causes client 126 to abort a second sub-operation of the deletion operation (to remove the key-value pair from RKVS 112) and to wait for a pre-determined amount of time to allow the Influx flags to be cleared.

After waiting the pre-determined amount of time, during which the Influx flags are cleared from entries 406 and 410 as shown in snapshot 436, client 126 performs a second attempt at the first sub-operation, of the deletion operation, to read header 310 and key 320 from entries 406 and 410. Based on the results of the first sub-operation, client 126 determines that ($K_z$, $V_z$) is stored in entry 406 and is available for deletion, i.e., with flag bits 1000. Client 126 performs a second sub-operation of the deletion operation to remove the key-value pair from RKVS 112 by zeroing out header 310 and key 320 information for entry 406, as shown in snapshot 438.

Insertion Operation Design: Fence Flag

Figure 5:
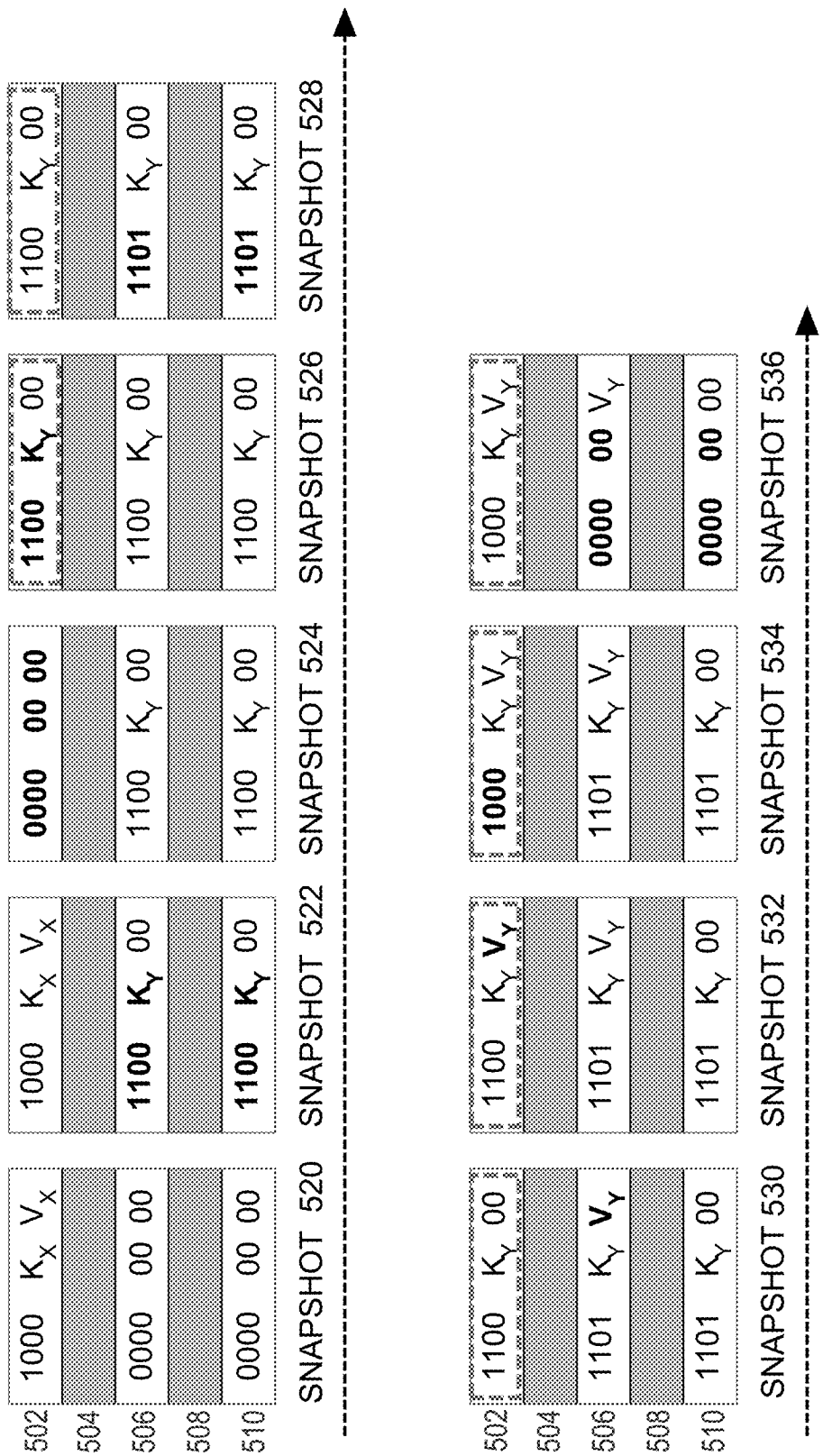

Fence flag 318 is useful in prevention of insertion failures by allowing communication between processes regarding the priority of processes to insert a particular key-value pair. For example, FIG. 5 depicts a series of snapshots 520-536 of hash table 114 (with example entries 502-510) over time to depict an example of the usefulness of the Fence flag. Specifically, client 122 performs a first sub-operation of an operation to insert ($K_y$, $V_y$) into hash table 114 by reading header 310 and key 320 information from the three entries 502, 506, and 510 in the hash table that map to the key-value pair. In this example, client 122 performs the first sub-operation while hash table 114 is as shown in snapshot 520. Thus, client 122 finds entry 502 occupied with another key-value pair, ($K_x$, $V_x$), and finds entries 506 and 510 empty. Client 122 moves ahead with the insertion operation over the empty entries by performing a second sub-operation of the insertion operation to set key 320 information of entries 506 and 510 to $K_y$, and also to set the Allocd and Influx flags in header 310 information of those entries to indicate that they are undergoing an insertion operation for ($K_y$, $V_y$). The results of the second sub-operation are shown in snapshot 522.

Subsequent to client 122 determining that entry 502 was occupied by ($K_x$, $V_x$), this key-value pair is deleted from entry 502, which is shown by the zeroed out flags of header 310 and zeroed out key 320 of entry 502 in snapshot 524. In this example, this deletion could happen at any time after client 122 checks entry 502 via the first sub-operation of the insertion operation, before client 122 completes the insertion operation, and also before a second client, such as client 124, initiates a second insertion operation of ($K_y$, $V_y$) into hash table 114. Note that snapshot 524 also indicates that value 330 of entry 502 is zeroed out after ($K_x$, $V_x$) is deleted from the entry for ease of explanation. Once the header information of a given entry is set to indicate that the entry is empty, i.e., 0000, the information stored in the remainder of the entry is treated as garbage information until another key-value pair is inserted into the entry. As such, it is not necessary to perform an operation to zero out the value 330 of an entry in order to delete the contents of the entry.

Continuing with the example of FIG. 5, while hash table 114 is in the state indicated by snapshot 524, client 124 initiates a second insertion operation of ($K_y$, $V_y$) into hash table 114. Specifically, client 124 performs the first sub-operation of the insertion operation to read header 310 and key 320 from entries 502, 506, and 510 that map to ($K_y$, $V_y$). In this case, client 124 finds that entry 502 is empty and that entries 506 and 510 both have Influx flags set and key 320 information indicating $K_y$.

In the case where a client finds an Influx bit already set in one of the target entries of an insertion operation, the response depends on whether the key 320 information matches the key that is being inserted by the client. If key 320 information for a given target entry indicates a different key-value pair, then the entry is locked for an insertion operation of a different key value pair. As shown in snapshot 522 in entries 506 and 510 as reserved by client 122, the first sub-operation of an insertion operation is performed using one or more CAS requests that attempt to set header 310 and key 320 of empty target entries in hash table 114 to header information with Allocd and Influx bits set and key information indicating the key to be inserted. Such an action reserves the entries for insertion of the desired key-value pair. If, during the CAS operations, at least one entry was successfully reserved for the key-value pair insertion, the client moves ahead with insertion of the value into one of the reserved entries.

However, if none of the CAS operations for the first sub-operation of the insertion operation successfully reserved an entry for the insertion, the client waits for a time for the Influx bit of the target entry that listed a different key to be cleared. This allows for the possibility that the entry is reserved for purposes of avoiding double-insertion and not for the purpose of inserting the other key-value pair into the needed entry. If, after the waiting period, the client finds that all of the target entries for the insertion operation are full, the client initiates collision remediation, as described in detail below.

On the other hand, if key 320 of one or more of the target entries that client 124 attempted to reserve (but found with the Influx bit set) indicates the same key that is being inserted by client 124, that means that another process has locked the one or more entries for insertion of that same key-value pair. In this case, if client 124 is able to reserve at least one of the target entries, the client attempts to take priority to insert the key-value pair by blocking the other insertion using the Fence bit. To illustrate using the example of FIG. 5, client 124 finds entries 506 and 510 have the Influx flags set and also have the same key in key 320 as the key that client 124 is attempting to insert. Thus, the attempt to reserve these entries 506 and 510 fails. However, as shown in snapshot 526, the attempt to reserve entry 502 succeeds given that the entry was empty when client 124 performed the first sub-operation of the insertion operation. In snapshots 526-536, the dashed border around entry 502 and lack of dashed border around entries 506 and 510 illustrate the difference in ownership between entries 502 and entries 506 and 510. Specifically, client 124 controls entry 502, and client 122 controls entries 506 and 510.

When multiple different clients have reserved entries in hash table 114 to insert the same key-value pair, one of the clients takes priority to perform the insertion operation. According to an embodiment, priority is determined either by a client blocking the one or more other clients from performing the insertion or by a client completing the insertion operation before another client has a chance to block the operation. According to another embodiment, priority goes to the client that reserved the entry, for the key-value pair, with the lowest index. Because priority is asserted by one of the inserting clients, multiple insertion operations inserting the same key-value pair at the same time may not occur. Specifically, the client that has lost priority detects the action that established priority of the other client, and aborts any further sub-operations needed to complete the non-priority insertion operation.

In order to block client 122 from completing the insertion operation began in entries 506 and 510, client 124 attempts to set the Fence bits of entries 506 and 510. In this example, the attempt to set these Fence bits succeeds, as shown in snapshot 528, which success is a result of ($K_y$, $V_y$) having not yet been successfully inserted into either of entries 506 or 510 by client 122. Client 124 continues with the second sub-operation of the insertion operation by sending an RDMA write request to write $V_y$ to value 330 of entry 502, as shown in snapshot 532. Client 124 performs the third sub-operation of the insertion operation by setting the header 310 of entry 502 to 1000, as shown in snapshot 534, which indicates that the entry is occupied and ready to be read.

When client 122 attempts to continue its insertion of ($K_y$, $V_y$), client 122 performs a second sub-operation of the insertion operation by writing $V_y$ as value 330 of entry 506 using an RDMA write request, as shown in snapshot 530. However, when client 122 attempts to perform the third sub-operation of the insertion operation to change header 310 of entry 506 from '1100' to '1000' using an RDMA CAS request, the request fails because the Fence bit is set, i.e., the comparison performed by the CAS request between the expected value of header 310 of entry 506 (1100) and the actual value of the header (1101) causes the CAS request to return false and to not perform the swap. Based on the Fence bit being set in header 310 of entry 506, Client 122 determines that it did not have priority to insert ($K_y$, $V_y$). According to an embodiment, in response to determining that it did not have priority to insert ($K_y$, $V_y$), client 122 clears header 310 and key 320 for entries 506 and 510, as shown in snapshot 536. According to another embodiment, client 124 clears header 310 and key 320 for entries 506 and 510 as part of its third sub-operation. Thus, only one of the clients succeeds in inserting the key-value pair.

Figure 6:
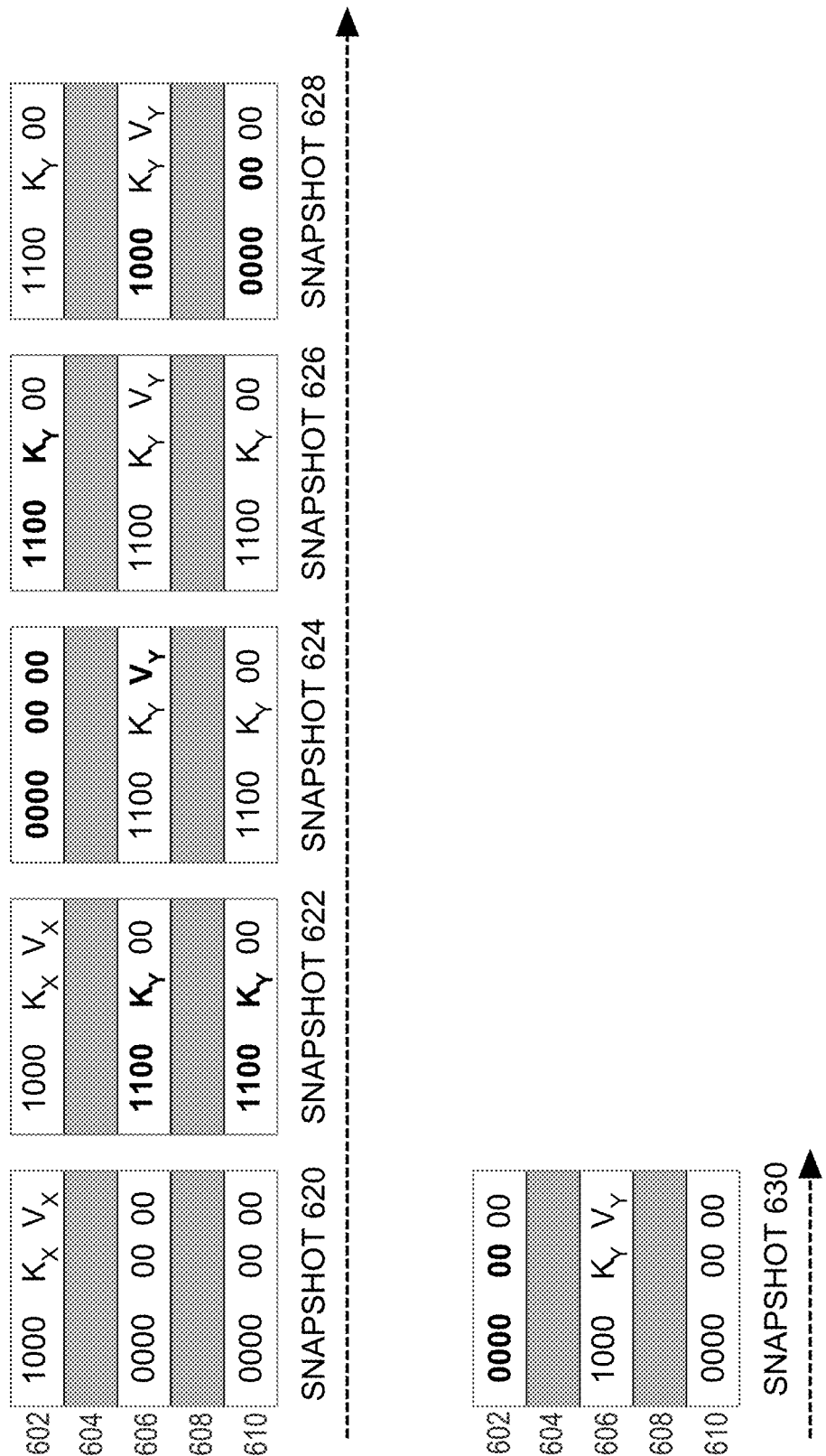

FIG. 6 depicts a series of snapshots 620-630 of hash table 114 over time in which occurrences similar to those of FIG. 5, specifically, at snapshots 520/620, 522/622, and 524/624. One difference in the sequence of snapshots is that client 122 proceeds with the second sub-operation of the insertion operation to insert ($K_y$, $V_y$) into hash table 114. Specifically, as shown in entry 606 of snapshot 624, client 122 sends an RDMA write request to write $V_y$ into value 330 of entry 606. Before client 122 sets the header bits of entry 606 to '1000', client 124 reserves entry 602 and determines that entries 606 and 610 were previously reserved by another client, as shown in snapshot 626. After client 124 reserves entry 602 and before client 124 sets the Fence bits for entries 606 and 608, client 122 performs the third sub-operation of the insertion operation to set the header bits of entry 606 to '1000' and to zero out the header bits and key 320 of entry 610, as shown in snapshot 628. When client 124 attempts to set the Fence bits of entries 606 and 610 using CAS-type RDMA requests, the CAS requests because ($K_y$, $V_y$) has been successfully inserted into entry 606 by the other client, i.e., the header bits expected by client 124 (1100) in the CAS request do not match the actual header bits in the entries ('1000' for entry 606, and '0000' for entry 610) at snapshot 628. Accordingly, client 124 aborts the remaining sub-operations of the insertion operation and zeroes out header 310 and key 320 in entry 602, as shown in snapshot 630.

Insertion Operation Design: Time Flag

During the first sub-operation of an insertion operation, the inserting client may find that one of the target entries has the Time bit set, which indicates that the particular target entry is involved in collision remediation as described in further detail below. If key 320 information for the particular target entry has the same key that is being inserted, then the key-value pair already exists in RKVS 112 and the client aborts the insertion operation. If key 320 information for the entry indicates a different key than the one that is being inserted, and if the client has successfully reserved one or more other entries in hash table 114 for the insertion operation, the client proceeds with the insertion operation using the reserved one or more entries. However, if the client has not reserved any other entry for the insertion operation, the client waits for the Time bit to be cleared from the particular target entry before proceeding with the insertion operation.

Collision Resolution: Key-Value Pair Relocation

As indicated above, a collision avoidance scheme is generally used within hash table 114 implementing RKVS 112. However, notwithstanding application of such a scheme, collisions may still occur within hash table 114, i.e., when a client that is attempting to write a key-value pair to hash table 114 does not find a free entry that is mapped to the key-value pair. In this situation, if the client is not database server instance 108, the client sends a collision resolution request for the key-value pair to database server instance 108. Upon identifying a collision (either locally or based on a received collision resolution request), database server instance 108 undertakes to resolve the collision for the key-value pair and to insert the key-value pair into RKVS 112.

According to an embodiment, in order to limit the processing power needed to resolve a collision, database server instance 108 limits the amount of time spent on a determination of whether relocation operations will resolve the collision, described below, to a pre-determined amount of time for collision remediation. Accordingly, to resolve the collision, database server instance 108 utilizes at most the pre-determined amount of time for collision remediation to determine whether relocating one or more of the key-value pairs in hash table 114 results in space cleared out for the key-value pair to be inserted in one of its mapped entries.

According to an embodiment, this determination comprises performing relocations within hash table 114. According to another embodiment, this determination comprises performing analysis of potential relocations without performing the relocations during the determination process. In this embodiment, if database server instance 108 determines, before the timer tolls, that relocation results in space for the key-value pair, database server instance 108 performs the relocations needed to clear the space as described above. According to an embodiment, the collision resolution using the determined sequence of relocations must also be completed before the time tolls in order to avoid hash table resize.

According to one or more embodiments, the flags in header 310 for entries in the hash table implementing RKVS 112 allow for collision resolution actions to be performed within RKVS 112—including relocation of key-value pairs within hash table 114 and reallocation of the hash table to increase the size of the table—while maintaining availability of data stored in RKVS 112. Specifically, database server instance 108 sets the Time flag in connection with relocating a key-value pair for collision remediation in order to communicate the occurrence of the relocation operation to other processes that utilize the information in RKVS 112. Thus, other processes that access RKVS 112 are able to continue accessing the data while properly handling entries involved in a relocation operation.

A relocation operation involves three RDMA requests (which may be performed in parallel on destination and source entries for the operation, as needed): (1) a first CAS-type sub-operation for each entry to set appropriate flags in the headers of both the destination and source entries and to set key 320 to the appropriate key, as needed; (2) a second write sub-operation to set value 330 of the destination entry to be the value of the key-value pair being relocated; and (3) a third CAS-type sub-operation to adjust appropriate flags in header 310 of the source and destination entries to complete the relocation operation.

Figure 7:
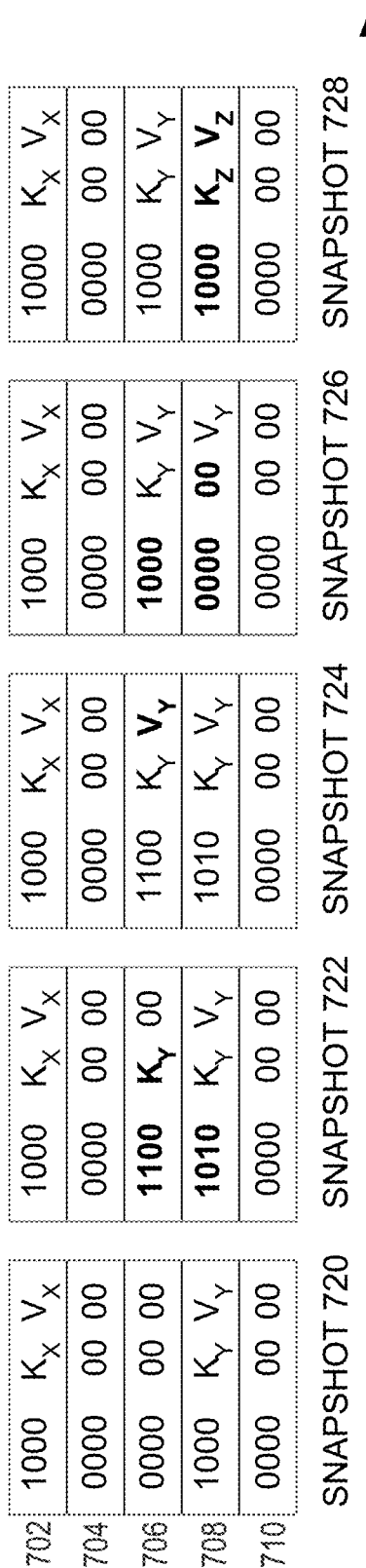

To illustrate a relocation operation, FIG. 7 depicts snapshots 720-728 of hash table 114 including five entries 702-710 over time. Specifically, at snapshot 720, entries 702 and 708 are populated with key-value pairs $(K_x, V_x)$ and $(K_y, V_y)$, respectively. Accordingly, these entries are associated with the flag values '1000', where the Allocd flag is the only set flag. Entries 704, 706, and 710 are empty and, as such, are associated with the flag values '0000'.

With entries 702-710 in the state indicated at snapshot 720, client 122 attempts to insert the key-value pair $(K_z, V_z)$ into hash table 114. The collision avoidance scheme being implemented for hash table 114 has two hash functions, which map $(K_z, V_z)$ to entries 702 and 708, respectively. Because both of the entries to which $(K_z, V_z)$ maps are occupied with other key-value pairs, client 122 sends a collision resolution request to database server instance 108 for $(K_z, V_z)$. Based on the collision resolution request, database server instance 108 determines whether either of entries 702 or 708 could be relocated within hash table 114 in order to resolve the collision. Database server instance 108 determines that $(K_y, V_y)$ maps to entries 706 and 708, where entry 706 is unoccupied, as shown in snapshot 720.

To relocate $(K_y, V_y)$ from source entry 708 to destination entry 706, database server instance 108 performs a first sub-operation of the relocation operation via performance of two local CAS operations (e.g., in parallel), the results of which are depicted in snapshot 722. Specifically, one of the CAS operations changes, in entry 706, header 310 bits to '1100' and key 320 to be $K_y$ to indicate, by the set Influx bit, that the value for $K_y$ is in process of being written to entry 706. The other CAS operation changes, in entry 708, header 310 bits to '1010' to indicate, by the set Time bit, that the current contents of the entry, $(K_y, V_y)$, is in process of being relocated.

Once the first sub-operation of the relocation operation is complete, database server instance 108 performs a second sub-operation of the relocation operation via a local write of $V_y$ to value 330 of entry 706, as shown in snapshot 724. Once the second sub-operation of the relocation operation is complete, database server instance 108 performs a third sub-operation of the relocation operation via two local CAS operations (e.g., performed in parallel), the results of which are depicted in snapshot 726. Specifically, one of the CAS operations changes, in entry 706, header 310 bits to '1000' to indicate that the entry is occupied and ready for other operations. The other CAS operation changes, in entry 708, header 310 bits to '0000' to indicate that entry 708 is currently empty and, according to an embodiment, also sets other information within entry 708 to zero, such as key 320.

Accordingly, the relocation operation frees entry 708 for insertion of $(K_z, V_z)$, which database server instance 108 performs, as described in detail above, the end result of which is depicted in snapshot 728.

According to one or more embodiments, if, during the first sub-operation of a relocation operation, database server instance 108 determines that the destination entry has the Influx bit set, database server instance 108 delays for a predetermined amount of time and then retries the relocation operation. This delay allows time for the client that reserved the target destination entry to complete the current operation and, potentially, to free the entry for use as the destination of the relocation, e.g., in the case that the entry was reserved to avoid double-insertion.

Collision Resolution: Hash Table Resize

Figure 8:
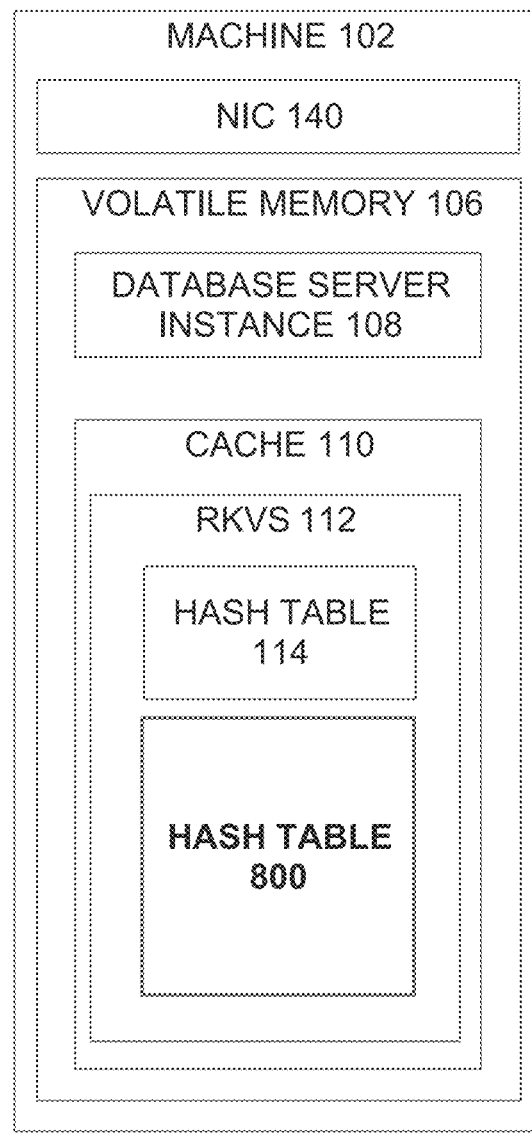
FIG. 8 depicts a second hash table implementing a key-value store for purposes of key-value migration in connection with collision resolution.

If the pre-determined amount of time for collision remediation tolls before the detected collision is resolved by relocation operations, database server instance 108 automatically ceases relocation operations and resizes the hash table that implements RKVS 112 in volatile memory 106. To illustrate, database server instance 108 allocates another hash table 800 in cache 110 to implement RKVS 112, as depicted in FIG. 8, in which like reference numbers refer to corresponding depictions and descriptions in FIG. 1. Hash table 800 is larger in size than hash table 114, e.g., double. According to an embodiment, ceasing relocation operations includes unsetting any Time bit that database server instance 108 has set in connection with collision remediation relocation operations.

Figure 9:
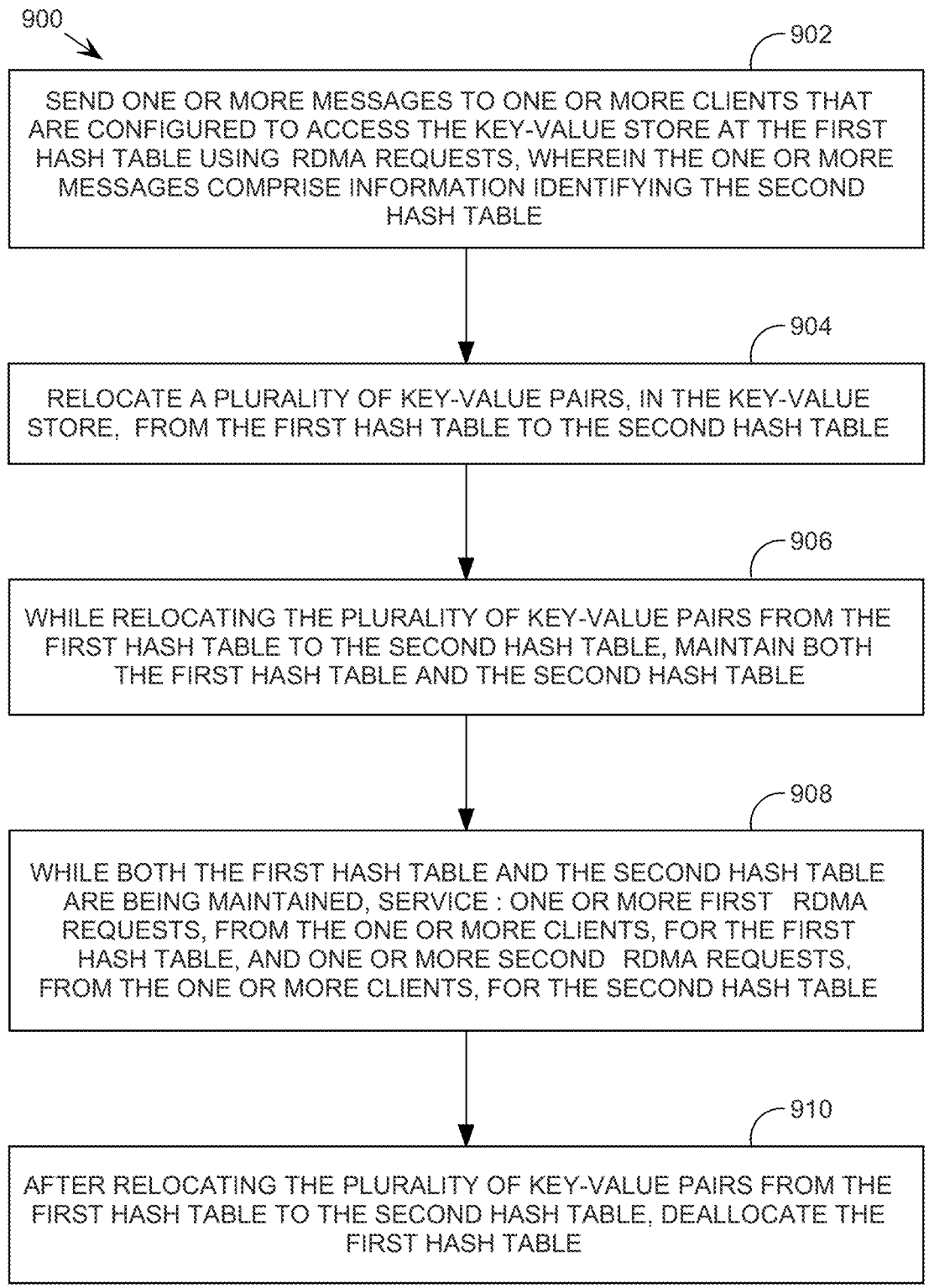
FIG. 9 depicts a flowchart for migrating at least a portion of a key-value store from a first hash table in volatile memory to a second hash table in the volatile memory.

FIG. 9 depicts a flowchart 900 for migrating at least a portion of a key-value store from a first hash table in volatile memory to a second hash table in the volatile memory. At step 902 of flowchart 900, one or more messages are sent to one or more clients that are configured to access the key-value store at the first hash table using RDMA requests, wherein the one or more messages comprise information identifying the second hash table. For example, upon determining to migrate the key-value pairs of RKVS 112 from hash table 114 to hash table 800, database server instance 108 sends messages to each client that is authenticated to access hash table 114 via RDMA, e.g., clients 122-126. The messages indicate migration of the key-value store and identify hash table 800. These messages allow the clients to continue accessing RKVS during migration between the two hash tables.

Based on these messages, clients 122-126 (and any other clients that are registered to access hash table 114 via RDMA) register to access hash table 800 via RDMA, as described in detail above. Thus, database server instance 108 and any clients that are authorized to access hash table 114 are able to access both hash table 114 and hash table 800 during the migration.

At step 904, a plurality of key-value pairs, in the key-value store, are relocated from the first hash table to the second hash table. For example, database server instance 108 migrates the key-value pairs stored in hash table 114 to hash table 800 without requiring operations by clients in RKVS 112 to halt during the migration. Database server instance 108 performs migration between hash table 114 and hash table 800 in a manner similar to the relocation operations described above, except that the source entries of the relocation operations are in hash table 114 and the destination entries of the relocation operations are in hash table 800.

At step 906, while relocating the plurality of key-value pairs from the first hash table to the second hash table, both the first hash table and the second hash table are maintained. For example, database server instance 108 maintains both hash table 114 and hash table 800 in volatile memory 106 during the migration of the key-value pairs.

At step 908, while both the first hash table and the second hash table are being maintained, one or more first RDMA requests, from the one or more clients, for the first hash table are serviced, and one or more second RDMA requests, from the one or more clients, for the second hash table are serviced. For example, NIC 140 services RDMA requests from one or more of clients 122-126 for both hash table 114 and hash table 800.

Specifically, during the migration, lookup operations are performed within both hash table 114 and hash table 800. Furthermore, insertion operations are performed within hash table 800, and not within hash table 114. Deletion operations are also performed within both hash table 114 and hash table 800. During the migration process, when a client comes across an entry in hash table 114 (which is the target of a particular operation) with the Time flag set, the client waits an amount of time to allow the relocation to be completed and then attempts the operation within hash table 800 (rather than in both hash table 114 and hash table 800).

At step 910, after relocating the plurality of key-value pairs from the first hash table to the second hash table, the first hash table is deallocated. For example, after relocating all of the key-value pairs from hash table 114 to hash table 800, database server instance 108 sends another message to each client with RDMA access to RKVS 112 to inform the client of the migration completion. Database server instance 108 then deallocates hash table 114, and, subsequently, hash table 800 performs as the hash table implementing RKVS 112 on server machine 102.

Thus, while some operation types may be slower during migration for collision resolution because of the requirement to perform the operation types over both hash tables 114 and 800, all types of operations, including insertion, deletion, and lookup, are able to be continued in every step of collision resolution in RKVS 112.

Additional System Details

Referring to FIG. 1, one or more clients 122-126 execute, e.g., as parallel processes, on a machine 120. Clients 122-126 may be variously implemented, for example, as processes, database applications, or other database server instances executing on machines other than the host server machine. A client may also be a client-side database server process that is linked into a database application, or the combination of such a process and the database application into which the process is linked.

While clients 122-126 are described herein as residing on a single machine, clients with access to RKVS 112 may execute on any number of computing devices that are communicatively coupled to machine 102, e.g., through network 130. An application, process, or service, such as any of clients 122-126 or database server instance 108, runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
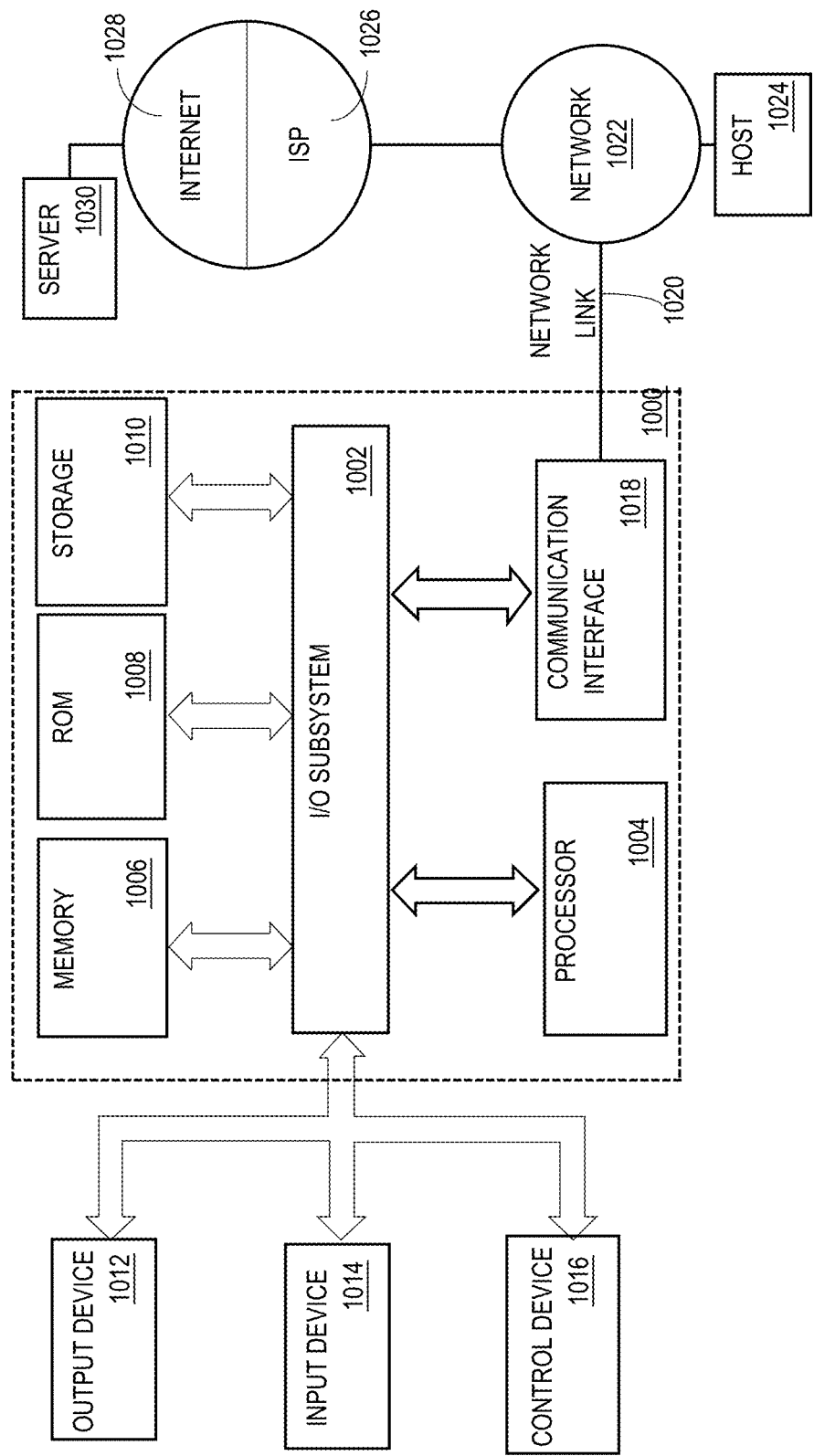
FIG. 10 is a block diagram of a computer system on which embodiments may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
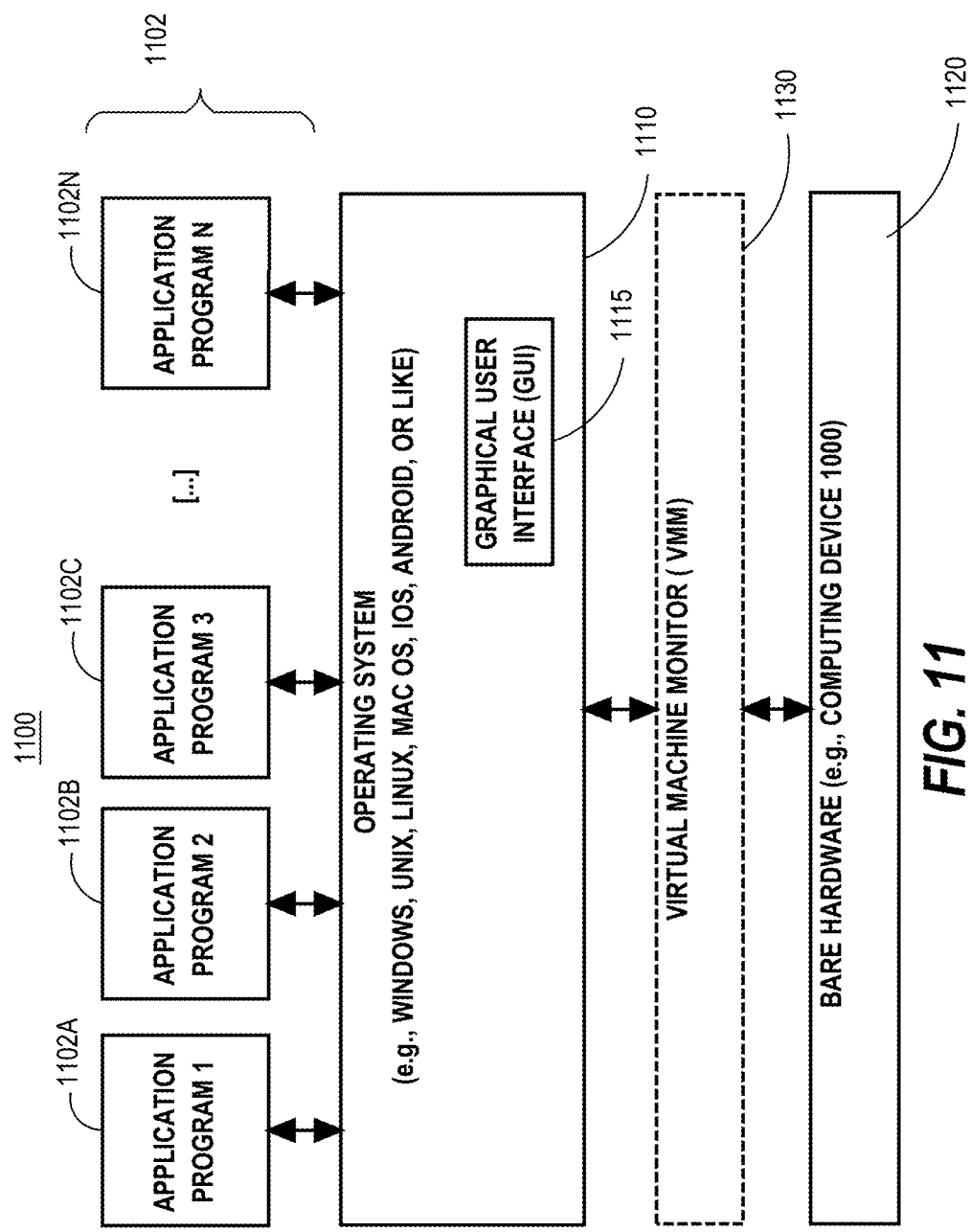
FIG. 11 depicts a software system that may be used in an embodiment.

FIG. 11 is a block diagram of a basic software system 1100 that may be employed for controlling the operation of computer system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computer system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
 a first process performing a first sub-operation of a particular key-value pair operation by:
  sending a remote direct memory access (RDMA) request to obtain header information from a particular entry, for a particular key-value pair, in a hash table in volatile memory of a computing device,
  wherein the header information comprises a set of flags that comprises one or more of:
   an allocd flag that indicates whether the particular entry is occupied,
   an influx flag that indicates whether an incomplete write operation, to the particular entry, is in process,
   a time flag that indicates whether data in the particular entry is undergoing migration, and
   a fence flag that indicates whether a second process, other than the first process, has priority for inserting the particular key-value pair into the hash table,
  determining that one or more flags, of the set of flags, are set; and
 based on the first sub-operation of the particular key-value pair operation determining that the one or more flags of the particular key-value pair are set, the first process aborting a second sub-operation of the particular key-value pair operation;
 wherein the method is performed by one or more computing devices.

2. The method of claim 1, wherein:
 the particular key-value pair includes a particular value;
 the particular key-value pair operation is a lookup operation to retrieve the particular value from the particular entry of the hash table;
 the one or more flags comprise the time flag; and
 the method further comprises, after aborting the second sub-operation of the particular key-value pair operation and after a pre-determined amount of time subsequent to said determining that the one or more flags are set, the first process performing a second lookup operation to retrieve the particular value.

3. The method of claim 2, wherein the first process performs the second lookup operation to retrieve the particular value from the hash table.

4. The method of claim 2, wherein:
the hash table (a) is a first hash table, and (b) implements a key-value store;
the method further comprises determining that the key-value store is being migrated from the first hash table to a second hash table;
the first process performs the second lookup operation to retrieve the particular value over both the first hash table and the second hash table based, at least in part, on said determining that the key-value store is being migrated from the first hash table to the second hash table.

5. The method of claim 1, wherein:
the particular key-value pair operation is an insertion operation to insert the particular key-value pair into the particular entry of the hash table;
the one or more flags comprises the fence flag;
the method further comprises, after aborting the second sub-operation of the particular key-value pair operation, sending a second RDMA request to unset one or more flag bits in the header information of the particular entry.

6. The method of claim 1, wherein:
the particular key-value pair includes a particular value;
the particular key-value pair operation is a lookup operation to retrieve the particular value from the particular entry of the hash table;
the one or more flags comprises the influx flag;
the method further comprises, after aborting the second sub-operation of the particular key-value pair operation and after a pre-determined amount of time subsequent to said determining that the one or more flags are set, the first process performing a second lookup operation to retrieve the particular value.

7. The method of claim 1, wherein:
the RDMA request is a compare and swap (CAS)-type RDMA request;
the CAS-type RDMA request compares the header information, from the particular entry, to target header information in which one or more unset flag bits correspond to the one or more flags;
said determining that the one or more flags, of the set of flags, are set comprises: the CAS-type RDMA request returning information indicating that the header information, from the particular entry, does not match the target header information.

8. A computer-executed method for migrating at least a portion of a key-value store from a first hash table in volatile memory to a second hash table in the volatile memory comprising:
sending one or more messages to one or more clients that are configured to access the key-value store at the first hash table using RDMA requests, wherein the one or more messages comprise information identifying the second hash table;
relocating a plurality of key-value pairs, in the key-value store, from the first hash table to the second hash table;
while relocating the plurality of key-value pairs from the first hash table to the second hash table, maintaining both the first hash table and the second hash table;
while both the first hash table and the second hash table are being maintained, servicing:
one or more first RDMA requests, from the one or more clients, for the first hash table, and
one or more second RDMA requests, from the one or more clients, for the second hash table; and
after relocating the plurality of key-value pairs from the first hash table to the second hash table, deallocating the first hash table;
wherein the method is performed by one or more computing devices.

9. The method of claim 8, wherein relocating the plurality of key-value pairs from the first hash table to the second hash table comprises relocating a particular key-value pair, of the plurality of key-value pairs, from a first entry of the first hash table to a second entry of the second hash table by:
setting a time flag in header information for the first entry of the first hash table; and
after said setting the time flag, writing information for the particular key-value pair to the second entry of the second hash table.

10. The method of claim 8, further comprising, during said relocating the plurality of key-value pairs, a particular client, of the one or more clients, the method further comprises performing a lookup operation for a particular key-value pair, of the plurality of key-value pairs, from the key-value store, at least in part, by sending a first RDMA request, of the one or more first RDMA requests, to the first hash table and sending a second RDMA request, of the one or more second RDMA requests, to the second hash table.

11. The method of claim 8, further comprising, during said relocating the plurality of key-value pairs, a particular client, of the one or more clients, performing an insertion operation to insert a particular key-value pair, of the plurality of key-value pairs, into the key-value store, at least in part, by sending a third RDMA request to write information for the particular key-value pair to the second hash table.

12. One or more non-transitory computer-readable media storing one or more sequences of instructions that, when executed by one or more processors, cause:
a first process performing a first sub-operation of a particular key-value pair operation by:
sending a remote direct memory access (RDMA) request to obtain header information from a particular entry, for a particular key-value pair, in a hash table in volatile memory of a computing device,
wherein the header information comprises a set of flags that comprises one or more of:
an allocd flag that indicates whether the particular entry is occupied,
an influx flag that indicates whether an incomplete write operation, to the particular entry, is in process,
a time flag that indicates whether data in the particular entry is undergoing migration, and
a fence flag that indicates whether a second process, other than the first process, has priority for inserting the particular key-value pair into the hash table,
determining that one or more flags, of the set of flags, are set; and
based on the first sub-operation of the particular key-value pair operation determining that the one or more flags of the particular key-value pair are set, the first process aborting a second sub-operation of the particular key-value pair operation.

13. The one or more non-transitory computer-readable media of claim 12, wherein:
the particular key-value pair includes a particular value;
the particular key-value pair operation is a lookup operation to retrieve the particular value from the particular entry of the hash table;
the one or more flags comprise the time flag; and
the one or more sequences of instructions further comprise instructions that, when executed by the one or more processors, cause, after aborting the second sub-operation of the particular key-value pair operation and after a pre-determined amount of time subsequent to said determining that the one or more flags are set, the first process performing a second lookup operation to retrieve the particular value.

14. The one or more non-transitory computer-readable media of claim 13, wherein the first process performs the second lookup operation to retrieve the particular value from the hash table.

15. The one or more non-transitory computer-readable media of claim 13, wherein:
the hash table (a) is a first hash table, and (b) implements a key-value store;
the one or more sequences of instructions further comprise instructions that, when executed by the one or more processors, cause determining that the key-value store is being migrated from the first hash table to a second hash table;
the first process performs the second lookup operation to retrieve the particular value over both the first hash table and the second hash table based, at least in part, on said determining that the key-value store is being migrated from the first hash table to the second hash table.

16. The one or more non-transitory computer-readable media of claim 12, wherein:
the particular key-value pair operation is an insertion operation to insert the particular key-value pair into the particular entry of the hash table;
the one or more flags comprises the fence flag;
the one or more sequences of instructions further comprise instructions that, when executed by the one or more processors, cause, after aborting the second sub-operation of the particular key-value pair operation, sending a second RDMA request to unset one or more flag bits in the header information of the particular entry.

17. The one or more non-transitory computer-readable media of claim 12, wherein:
the particular key-value pair includes a particular value;
the particular key-value pair operation is a lookup operation to retrieve the particular value from the particular entry of the hash table;
the one or more flags comprises the influx flag;
the one or more sequences of instructions further comprise instructions that, when executed by the one or more processors, cause, after aborting the second sub-operation of the particular key-value pair operation and after a pre-determined amount of time subsequent to said determining that the one or more flags are set, the first process performing a second lookup operation to retrieve the particular value.

18. The one or more non-transitory computer-readable media of claim 12, wherein:
the RDMA request is a compare and swap (CAS)-type RDMA request;
the CAS-type RDMA request compares the header information, from the particular entry, to target header information in which one or more unset flag bits correspond to the one or more flags;
said determining that the one or more flags, of the set of flags, are set comprises: the CAS-type RDMA request returning information indicating that the header information, from the particular entry, does not match the target header information.

19. One or more non-transitory computer-readable media storing instructions that, when executed by one or more processors, cause:
sending one or more messages to one or more clients that are configured to access a key-value store at a first hash table in volatile memory using RDMA requests, wherein the one or more messages comprise information identifying a second hash table in the volatile memory;
relocating a plurality of key-value pairs, in the key-value store, from the first hash table to the second hash table;
while relocating the plurality of key-value pairs from the first hash table to the second hash table, maintaining both the first hash table and the second hash table;
while both the first hash table and the second hash table are being maintained, servicing:
one or more first RDMA requests, from the one or more clients, for the first hash table, and
one or more second RDMA requests, from the one or more clients, for the second hash table; and
after relocating the plurality of key-value pairs from the first hash table to the second hash table, deallocating the first hash table.

20. The one or more non-transitory computer-readable media of claim 19, wherein relocating the plurality of key-value pairs from the first hash table to the second hash table comprises relocating a particular key-value pair, of the plurality of key-value pairs, from a first entry of the first hash table to a second entry of the second hash table by:
setting a time flag in header information for the first entry of the first hash table; and
after said setting the time flag, writing information for the particular key-value pair to the second entry of the second hash table.

21. The one or more non-transitory computer-readable media of claim 19, wherein, the instructions include a set of instructions that, when executed by the one or more processors, causes, during said relocating the plurality of key-value pairs, a particular client, of the one or more clients, performing a lookup operation for a particular key-value pair, of the plurality of key-value pairs, from the key-value store, at least in part, by sending a first RDMA request, of the one or more first RDMA requests, to the first hash table and sending a second RDMA request, of the one or more second RDMA requests, to the second hash table.

22. The one or more non-transitory computer-readable media of claim 19, wherein, the instructions include a set of instructions that, when executed by the one or more processors, causes, during said relocating the plurality of key-value pairs, a particular client, of the one or more clients, performing an insertion operation to insert a particular key-value pair, of the plurality of key-value pairs, into the key-value store, at least in part, by sending third RDMA request to write information for the particular key-value pair to the second hash table.

\* \* \* \* \*

UNITED STATES PATENT AND TRADEMARK OFFICE
CERTIFICATE OF CORRECTION

| | |
|---|---|
| PATENT NO. | : 11,500,856 B2 |
| APPLICATION NO. | : 16/571423 |
| DATED | : November 15, 2022 |
| INVENTOR(S) | : Khatami et al. |

It is certified that error appears in the above-identified patent and that said Letters Patent is hereby corrected as shown below:

On the Title Page

On page 2, Column 2, under item (56) Other Publications, Line 9, delete "SIGVOMM," and insert -- SIGCOMM, --, therefor.

In the Drawings

On sheet 2 of 11, in FIG 2, and on the Title Page, the illustrative print figure, under Reference Numeral 202A, Line 6, delete "ANALLOCD" and insert -- AN ALLOCD --, therefor.

In the Specification

In Column 3, Line 49, delete "($Key_x,VAL_x$)" and insert -- ($Key_x, VAL_x$) --, therefor.

In Column 3, Line 53, delete "($Key_x,VAL_x$)" and insert -- ($Key_x, VAL_x$) --, therefor.

In Column 11, Line 1, delete "nest" and insert -- dest --, therefor.

In Column 11, Line 25, delete "K." and insert -- $K_x$. --, therefor.

In Column 12, Line 41, delete "($K_x,V_x$)," and insert -- ($K_x, V_x$), --, therefor.

In Column 13, Line 7, delete "K." and insert -- $K_x$. --, therefor.

In Column 26, Line 12, delete "DbaaS" and insert -- DBaaS --, therefor.

Signed and Sealed this
Twenty-seventh Day of June, 2023

Katherine Kelly Vidal
*Director of the United States Patent and Trademark Office*

CERTIFICATE OF CORRECTION (continued)
U.S. Pat. No. 11,500,856 B2

In the Claims

In Column 30, Line 46, in Claim 21, delete "wherein," and insert -- wherein --, therefor.

In Column 30, Line 56, in Claim 22, delete "wherein," and insert -- wherein --, therefor.